(12) United States Patent
Chen et al.

(10) Patent No.: US 12,207,269 B2
(45) Date of Patent: Jan. 21, 2025

(54) DOWNLINK CONTROL CHANNEL MONITORING OR SENDING METHOD AND APPARATUS

(71) Applicant: HUAWEI TECHNOLOGIES CO., LTD., Shenzhen (CN)

(72) Inventors: Zheng Chen, Beijing (CN); Lixia Xue, Beijing (CN); Xiaolei Tie, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 412 days.

(21) Appl. No.: 17/514,666

(22) Filed: Oct. 29, 2021

(65) Prior Publication Data

US 2022/0053470 A1    Feb. 17, 2022

Related U.S. Application Data

(63) Continuation of application No. PCT/CN2020/087651, filed on Apr. 29, 2020.

(30) Foreign Application Priority Data

Apr. 30, 2019 (CN) .......................... 201910364602.8

(51) Int. Cl.
*H04W 72/23* (2023.01)
*H04L 1/00* (2006.01)
*H04W 76/28* (2018.01)

(52) U.S. Cl.
CPC .......... *H04W 72/23* (2023.01); *H04L 1/0061* (2013.01); *H04W 76/28* (2018.02)

(58) Field of Classification Search
None
See application file for complete search history.

(56) References Cited

U.S. PATENT DOCUMENTS

| 11,653,301 B2 * | 5/2023 | Kuo ...................... H04L 5/0053 370/329 |
| 2016/0135247 A1 | 5/2016 | Ozturk et al. |
| 2018/0199313 A1 | 7/2018 | Suzuki et al. |

(Continued)

FOREIGN PATENT DOCUMENTS

| CN | 109495234 A | 3/2019 |
| CN | 109496446 A | 3/2019 |
| WO | 2018203627 A1 | 11/2018 |

OTHER PUBLICATIONS

Chinese Notice of Allowance issued in corresponding Chinese Application No. 201910364602.8, dated Sep. 1, 2023, pp. 1-4.

(Continued)

*Primary Examiner* — Mariela Vidal Carpio

(57) ABSTRACT

A downlink control channel monitoring method includes determining a first search space (SS) set and a second SS set. The method also includes determining, based on a first priority of the first SS set and a second priority of the second SS set, whether to monitor a first physical downlink control channel (PDCCH) on a first downlink control channel candidate resource of the first SS set, and whether to monitor a second PDCCH on a second downlink control channel candidate resource of the second SS set. The first priority of the first SS set is equal to the second priority of the second SS set. The second PDCCH carries a power saving signal.

17 Claims, 10 Drawing Sheets

(56) References Cited

U.S. PATENT DOCUMENTS

| | | | |
|---|---|---|---|
| 2018/0368112 A1 | 12/2018 | Sebeni et al. | |
| 2019/0223164 A1* | 7/2019 | He | H04L 25/0204 |
| 2019/0297605 A1* | 9/2019 | Kim | H04W 72/23 |
| 2019/0297607 A1* | 9/2019 | Kim | H04W 72/23 |
| 2019/0306847 A1* | 10/2019 | Seo | H04W 72/046 |
| 2020/0100248 A1* | 3/2020 | Kim | H04W 76/11 |
| 2020/0112917 A1* | 4/2020 | Nam | H04W 72/23 |
| 2020/0314756 A1* | 10/2020 | Xu | H04L 5/0053 |
| 2021/0050936 A1* | 2/2021 | Seo | H04L 5/0053 |
| 2021/0360621 A1* | 11/2021 | Jiang | H04W 52/0235 |
| 2021/0385826 A1* | 12/2021 | Moon | H04L 1/00 |
| 2022/0015037 A1* | 1/2022 | Xu | H04W 52/0235 |
| 2022/0216972 A1* | 7/2022 | Takeda | H04L 5/0053 |
| 2022/0240182 A1* | 7/2022 | Baldemair | H04W 52/0206 |

OTHER PUBLICATIONS

Huawei et al., "PDCCH Based Power Saving Signal/Channel", 3GPP TSG RAN WG1 Meeting #96bis R1-1903988, Apr. 2, 2019, total 7 pages.
3GPP TS 38.213 V15.5.0 (Mar. 2019), 3rd Generation Partnership Project; Technical Specification Group Radio Access Network; NR; Physical layer procedures for control(Release 15), 104 pages.
ZTE, "Discussion on PDCCH-based Power Saving Signal", 3GPP TSG RAN WG1 #96bis R1-1905045, Apr. 3, 2019, total 6 pages.
International Search Report issued in corresponding International Application No. PCT/CN2020/087651, dated Jul. 23, 2020, pp. 1-10.
India Office Action issued in corresponding India Application No. 202147054537, dated Mar. 25, 2022, pp. 1-6.

\* cited by examiner

DOWNLINK CONTROL CHANNEL MONITORING OR SENDING METHOD AND APPARATUS

CROSS-REFERENCE TO RELATED APPLICATIONS

This application is a continuation of International Application No. PCT/CN2020/087651, filed on Apr. 29, 2020, which claims priority to Chinese Patent Application No. 201910364602.8, filed on Apr. 30, 2019. The disclosures of the aforementioned applications are hereby incorporated by reference in their entireties.

TECHNICAL FIELD

This application relates to the communications field, and in particular, to a downlink control channel monitoring method and apparatus, and a downlink control channel sending method and apparatus.

BACKGROUND

In a fifth generation (fifth generation, 5G) mobile communications system, data packet transmission is usually bursty. There is a to-be-transmitted data packet in a period of time, and there may be no to-be-transmitted data packet in another period of time. Therefore, a terminal device in the 5G mobile communications system receives a data packet based on a discontinuous reception (discontinuous reception, DRX) mechanism. In a DRX cycle, the terminal device usually starts a receiving circuit only in a part of a time period to monitor a downlink control channel, thereby reducing power consumption of the terminal device.

The terminal device usually monitors a downlink control channel in an active time (active time). If the terminal device monitors a power saving (power saving, PS) signal out of the active time (out of active time), the terminal device may enter the active time and monitor a downlink control channel. If the terminal device monitors no PS signal out of the active time, the terminal device does not need to enter the active time, and continues to be a "sleep" state. In this case, the PS signal functions as a wake-up signal (wake-up signal, WUS). In addition, the terminal device may monitor a PS signal in the active time. For example, the PS signal may indicate the terminal device to stop monitoring a PDCCH in the active time for a period of time, or indicate a periodicity in which the terminal device monitors a search space set.

Currently, a related standard only briefly defines a function of a PS signal, and does not specify in detail how a terminal device monitors a PS signal. Therefore, how to monitor a PS signal is an urgent problem that needs to be resolved at present.

SUMMARY

This application provides a downlink control channel monitoring method, so that a terminal device can flexibly monitor a power saving signal based on a monitoring capability of the terminal device.

According to a first aspect, a downlink control channel monitoring method is provided. The method includes: determining a first search space SS set and a second SS set; determining a priority of the second SS set based on a priority of the first SS set, where the priority of the first SS set is the same as the priority of the second SS set; and determining, based on the priority of the first SS set and the priority of the second SS set, whether to monitor a first physical downlink control channel PDCCH on a downlink control channel candidate resource of the first SS set, and whether to monitor a second PDCCH on a downlink control channel candidate resource of the second SS set, where the second PDCCH is used to carry a power saving signal.

The foregoing method may be applied to a terminal device. If a quantity of PDCCH candidates in the first SS set and the second SS set exceeds a blind detection capability of the terminal device, or a quantity of non-overlapped CCEs in the first SS set and the second SS set exceeds a blind detection capability of the terminal device, the terminal device may not monitor the first PDCCH or the second PDCCH. Otherwise, the terminal device may monitor the first PDCCH and the second PDCCH. Because the priority of the first SS set is the same as the priority of the second SS set, the terminal device may use a same processing manner for a plurality of SS sets including an SS set corresponding to the power saving signal, thereby simplifying complexity of monitoring the power saving signal by the terminal device on the downlink control channel candidate resource of the second SS set.

Optionally, the first PDCCH carries first downlink control information DCI, the second PDCCH carries second DCI, and a size of the first DCI is the same as a size of the second DCI.

The sizes of the first DCI and the second DCI are the same, so that complexity of blind detection and decoding by the terminal device can be reduced.

Optionally, the downlink control channel candidate resource of the first SS set includes the downlink control channel candidate resource of the second SS set, and the first SS set and the second SS set are associated with a same control resource set CORESET.

If the first SS set and the second SS set are associated with a same CORESET, scrambling sequences of the first PDCCH and the second PDCCH are the same. In addition, the downlink control channel candidate resource of the first SS set includes the downlink control channel candidate resource of the second SS set, so that some or all of CCE sets of the first PDCCH are the same as a CCE set of the second PDCCH, thereby reducing complexity of blind detection and decoding by the terminal device.

Optionally, start symbols of the downlink control channel candidate resources in the first SS set and the second SS set in a slot are the same.

The start symbols of the downlink control channel candidate resources in the first SS set and the second SS set in a slot are the same, so that a CCE of the first SS set and a CCE of the second SS set can be monitored as one CCE, thereby reducing complexity of channel estimation performed by the terminal device.

Optionally, when the second SS set is a UE-specific search space USS set, the first SS set is a USS set, a format of the first DCI is a format 1_0 or a format 0_0, and a cyclic redundancy check CRC of the second DCI is scrambled by using a cell radio network temporary identifier C-RNTI.

Because an excessive size of DCI carried on a PDCCH in the USS set affects monitoring performance of the terminal device, DCI of the power saving signal may be designed to be in a DCI format 1_0 or a DCI format 0_0. A size of DCI corresponding to the format 1_0 or the format 0_0 is relatively small. Therefore, a monitoring requirement of the terminal device can be met.

Optionally, when the second SS set is a common search space CSS set, the first SS set is a CSS set, and a type of the first SS set is one of the following types: a type 0, a type 0A, a type 1, a type 2, and a type 3.

When a CSS set corresponding to the power saving signal is associated with another CSS set (that is, the first SS set), based on the type of the first SS set, a type of the power saving signal may be one of the foregoing five types.

Optionally, the first SS set includes m first downlink control channel candidates, the second SS set includes M second downlink control channel candidates, an aggregation level of the m first downlink control channel candidates is the same as that of the M second downlink control channel candidates, m and M are positive integers, m≤M, and indexes of the m first downlink control channel candidates are the same as indexes of the first m downlink control channel candidates of the M second downlink control channel candidates.

Optionally, the method further includes: monitoring the second PDCCH on the downlink control channel candidate resource of the second SS set in a DRX active time.

According to a second aspect, a downlink control channel monitoring method is provided. The method includes: determining a first CSS set; determining a second CSS set, where a priority of the first CSS set is higher than a priority of the second CSS set; and determining, based on the priority of the first CSS set and the priority of the second CSS set, whether to monitor a first PDCCH on a downlink control channel candidate resource of the first CSS set, and whether to monitor a second PDCCH on a downlink control channel candidate resource of the second CSS set, where the second PDCCH is used to carry a power saving signal.

The downlink control channel candidate resource of the first CSS set usually carries relatively important information, for example, a system message. Therefore, after the priority of the first CSS set is set to be higher than the priority of the second CSS set, if complexity of blind detection corresponding to the first CSS set and the second CSS set exceeds a maximum blind detection capability of a terminal device, the terminal device may abandon monitoring the downlink control channel candidate resource of the second CSS set, thereby reducing impact of a CSS set corresponding to the power saving signal on another CSS set.

Optionally, the method further includes: determining a first USS set; and monitoring a third PDCCH on a downlink control channel candidate resource of the first USS set, where a priority of the first USS set is lower than the priority of the second CSS set; or a priority of the first USS set is higher than the priority of the second CSS set, and the priority of the first USS set is lower than the priority of the first CSS set.

A network device or a communication protocol may determine the priorities of the first USS set and the second CSS set based on content carried in DCI corresponding to the power saving signal. If the content carried in the DCI corresponding to the power saving signal is relatively important, the priority of the second CSS set may be set to be higher than the priority of the first USS set. If the content carried in the DCI corresponding to the power saving signal is common content, the priority of the second CSS set may be set to be lower than the priority of the first USS set. The foregoing solution enables the terminal device to flexibly monitor the power saving signal.

Optionally, the method further includes: determining a second USS set; and monitoring a fourth PDCCH on a downlink control channel candidate resource of the second USS set, where the fourth PDCCH is used to carry a power saving signal, and a priority of the second USS set is lower than the priority of the first USS set.

The terminal device may further monitor, on a downlink control channel candidate resource of a USS set, a PDCCH carrying a power saving signal, that is, the fourth PDCCH. To avoid an increase in a latency of a data packet and a decrease in a throughput of a data packet because monitoring of the fourth PDCCH by the terminal device affects scheduling of data by the network device, the network device or the communication protocol may configure the priority of the second USS set to be lower than the priority of the first USS set.

Optionally, an identifier of the second USS set is the larger one of an identifier of the first USS set and an identifier of the second USS set.

A larger identifier of an SS set indicates a lower priority of the SS set.

Optionally, the method further includes: monitoring the second PDCCH and the fourth PDCCH on the downlink control channel candidate resources of the second CSS set and the second USS set in a discontinuous reception DRX active time.

According to a third aspect, a downlink control channel sending method is provided. The method includes: determining a first search space SS set and a second SS set; determining a priority of the second SS set based on a priority of the first SS set, where the priority of the first SS set is the same as the priority of the second SS set; and determining, based on the priority of the first SS set and the priority of the second SS set, whether to send a first physical downlink control channel PDCCH on a downlink control channel candidate resource of the first SS set, and whether to send a second PDCCH on a downlink control channel candidate resource of the second SS set, where the second PDCCH is used to carry a power saving signal.

The foregoing method may be applied to a network device. If a quantity of PDCCH candidates in the first SS set and the second SS set exceeds a blind detection capability of a terminal device, or a quantity of non-overlapped CCEs in the first SS set and the second SS set exceeds a blind detection capability of a terminal device, the network device may not send the first PDCCH and the second PDCCH. Otherwise, the network device may send the first PDCCH or the second PDCCH. Because the priority of the first SS set is the same as the priority of the second SS set, the network device may use a same processing manner for a plurality of SS sets including an SS set corresponding to the power saving signal, thereby simplifying complexity of monitoring the power saving signal by the network device on the downlink control channel candidate resource of the second SS set.

Optionally, the first PDCCH carries first downlink control information DCI, the second PDCCH carries second DCI, and a size of the first DCI is the same as a size of the second DCI.

The sizes of the first DCI and the second DCI are the same, so that complexity of blind detection and decoding by the terminal device can be reduced.

Optionally, the downlink control channel candidate resource of the first SS set includes the downlink control channel candidate resource of the second SS set, and the first SS set and the second SS set are associated with a same control resource set CORESET.

If the first SS set and the second SS set are associated with a same CORESET, scrambling sequences of the first PDCCH and the second PDCCH are the same. In addition, the downlink control channel candidate resource of the first SS set includes the downlink control channel candidate resource of the second SS set, so that some or all of CCE sets of the first PDCCH are the same as a CCE set of the second PDCCH, thereby reducing complexity of blind detection and decoding by the terminal device.

Optionally, start symbols of the downlink control channel candidate resources in the first SS set and the second SS set in a slot are the same.

The start symbols of the downlink control channel candidate resources in the first SS set and the second SS set in a slot are the same, so that a CCE of the first SS set and a CCE of the second SS set can be monitored as one CCE, thereby reducing complexity of channel estimation performed by the terminal device.

Optionally, when the second SS set is a UE-specific search space USS set, the first SS set is a USS set, a format of the first DCI is a format 1_0 or a format 0_0, and a cyclic redundancy check CRC of the second DCI is scrambled by using a cell radio network temporary identifier C-RNTI.

Because an excessive size of DCI carried on a PDCCH in the USS set affects monitoring performance of the terminal device, DCI of the power saving signal may be designed to be in a DCI format 1_0 or a DCI format 0_0. A size of DCI corresponding to the format 1_0 or the format 0_0 is relatively small. Therefore, a monitoring requirement of the terminal device can be met.

Optionally, when the second SS set is a common search space CSS set, the first SS set is a CSS set, and a type of the first SS set is one of the following types: a type 0, a type 0A, a type 1, a type 2, and a type 3.

When a CSS set corresponding to the power saving signal is associated with another CSS set (that is, the first SS set), based on the type of the first SS set, a type of the power saving signal may be one of the foregoing five types.

Optionally, the first SS set includes m first downlink control channel candidates, the second SS set includes M second downlink control channel candidates, an aggregation level of the m first downlink control channel candidates is the same as that of the M second downlink control channel candidates, m and M are positive integers, m≤M, and indexes of the m first downlink control channel candidates are the same as indexes of the first m downlink control channel candidates of the M second downlink control channel candidates.

Optionally, the method further includes: sending the second PDCCH on the downlink control channel candidate resource of the second SS set in a DRX active time.

According to a fourth aspect, a downlink control channel sending method is provided. The method includes: determining a first CSS set; determining a second CSS set, where a priority of the first CSS set is higher than a priority of the second CSS set; and determining, based on the priority of the first CSS set and the priority of the second CSS set, whether to send a first PDCCH on a downlink control channel candidate resource of the first CSS set, and whether to send a second PDCCH on a downlink control channel candidate resource of the second CSS set, where the second PDCCH is used to carry a power saving signal.

The downlink control channel candidate resource of the first CSS set usually carries relatively important information, for example, a system message. Therefore, after the priority of the first CSS set is set to be higher than the priority of the second CSS set, if complexity of blind detection corresponding to the first CSS set and the second CSS set exceeds a maximum blind detection capability of a terminal device, a network device may abandon sending the downlink control channel candidate resource of the second CSS set, thereby reducing impact of a CSS set corresponding to the power saving signal on another CSS set.

Optionally, the method further includes: determining a first USS set; and sending a third PDCCH on a downlink control channel candidate resource of the first USS set, where a priority of the first USS set is lower than the priority of the second CSS set; or a priority of the first USS set is higher than the priority of the second CSS set, and the priority of the first USS set is lower than the priority of the first CSS set.

A network device or a communication protocol may determine the priorities of the first USS set and the second CSS set based on content carried in DCI corresponding to the power saving signal. If the content carried in the DCI corresponding to the power saving signal is relatively important, the priority of the second CSS set may be set to be higher than the priority of the first USS set. If the content carried in the DCI corresponding to the power saving signal is common content, the priority of the second CSS set may be set to be lower than the priority of the first USS set. The foregoing solution enables the network device to flexibly send the power saving signal.

Optionally, the method further includes: determining a second USS set; and sending a fourth PDCCH on a downlink control channel candidate resource of the second USS set, where the fourth PDCCH is used to carry a power saving signal, and a priority of the second USS set is lower than the priority of the first USS set.

The network device may further sending, on a downlink control channel candidate resource of a USS set, a PDCCH carrying a power saving signal, that is, the fourth PDCCH. To avoid an increase in a latency of a data packet and a decrease in a throughput of a data packet because sending of the fourth PDCCH by the network device affects scheduling of data by the network device, the network device or the communication protocol may configure the priority of the second USS set to be lower than the priority of the first USS set.

Optionally, an identifier of the second USS set is the larger one of an identifier of the first USS set and an identifier of the second USS set.

A larger identifier of an SS set indicates a lower priority of the SS set.

Optionally, the method further includes: sending the second PDCCH and the fourth PDCCH on the downlink control channel candidate resources of the second CSS set and the second USS set in a discontinuous reception DRX active time.

According to a fifth aspect, a downlink control channel monitoring method is provided. The method includes: determining a first USS set; determining a second USS set, where a priority of the first USS set is higher than a priority of the second USS set; and determining, based on the priority of the first USS set and the priority of the second USS set, whether to monitor a first physical downlink control channel PDCCH on a downlink control channel candidate resource of the first USS set, and whether to monitor a second PDCCH on a downlink control channel candidate resource of the second USS set, where the second PDCCH is used to carry a power saving signal.

The downlink control channel candidate resource of the first USS set usually carries relatively important information. Therefore, after the priority of the first USS set is set to be higher than the priority of the second USS set, if complexity of blind detection corresponding to the first USS set and the second USS set exceeds a maximum blind detection capability of a terminal device, the terminal device may abandon monitoring the downlink control channel candidate resource of the second USS set, thereby reducing impact of a USS set corresponding to the power saving signal on another USS set. In the foregoing solution, it may further avoid an increase in a latency of a data packet and a decrease in a throughput of a data packet because monitoring of the second PDCCH by the terminal device affects scheduling of data by the network device.

Optionally, the method further includes: determining a second CSS set; and monitoring a third PDCCH on a downlink control channel candidate resource of the second CSS set, where the third PDCCH is used to carry a power saving signal.

The priority of the first USS set is lower than a priority of the second CSS set; or the priority of the first USS set is higher than a priority of the second CSS set, and the priority of the first USS set is lower than a priority of the first CSS set.

A network device or a communication protocol may determine the priorities of the first USS set and the second CSS set based on content carried in DCI corresponding to the power saving signal. If the content carried in the DCI corresponding to the power saving signal is relatively important, the priority of the second CSS set may be set to be higher than the priority of the first USS set. If the content carried in the DCI corresponding to the power saving signal is common content, the priority of the second CSS set may be set to be lower than the priority of the first USS set. The foregoing solution enables the terminal device to flexibly monitor the power saving signal.

Optionally, the method further includes: determining the priorities of the second CSS set and the first USS set based on a value of an index number of the second CSS set and a value of an index number of the first USS set.

Optionally, the method further includes: determining a first CSS set; and monitoring a fourth PDCCH on a downlink control channel candidate resource of the first CSS set, where a priority of the first CSS set is higher than a priority of the second CSS set.

Optionally, an identifier of the second USS set is the larger one of an identifier of the first USS set and an identifier of the second USS set.

Optionally, the method includes: monitoring the first PDCCH and the second PDCCH on the downlink control channel candidate resources of the first USS set and the second USS set in a discontinuous reception DRX active time.

Optionally, the method further includes: monitoring the second PDCCH and the third PDCCH on the downlink control channel candidate resources of the second CSS set and the second USS set in a discontinuous reception DRX active time.

According to a sixth aspect, a downlink control channel sending method is provided. The method includes: determining a first USS set; determining a second USS set, where a priority of the first USS set is higher than a priority of the second USS set; and determining, based on the priority of the first USS set and the priority of the second USS set, whether to send a first physical downlink control channel PDCCH on a downlink control channel candidate resource of the first USS set, and whether to send a second PDCCH on a downlink control channel candidate resource of the second USS set, where the second PDCCH is used to carry a power saving signal.

The downlink control channel candidate resource of the first USS set usually carries relatively important information. Therefore, after a priority of a first CSS set is set to be higher than the priority of the second USS set, if complexity of blind detection corresponding to the first USS set and the second USS set exceeds a maximum blind detection capability of a terminal device, a network device may abandon sending the downlink control channel candidate resource of the second USS set, thereby reducing impact of a USS set corresponding to the power saving signal on another USS set. In the foregoing solution, it may further avoid an increase in a latency of a data packet and a decrease in a throughput because monitoring of the second PDCCH by the terminal device affects scheduling of data by the network device.

Optionally, the method further includes: determining a second CSS set; and sending a third PDCCH on a downlink control channel candidate resource of the second CSS set, where the third PDCCH is used to carry a power saving signal.

The priority of the first USS set is lower than a priority of the second CSS set; or the priority of the first USS set is higher than a priority of the second CSS set, and the priority of the first USS set is lower than the priority of the second CSS set.

A network device or a communication protocol may determine the priorities of the first USS set and the second CSS set based on content carried in DCI corresponding to the power saving signal. If the content carried in the DCI corresponding to the power saving signal is relatively important, the priority of the second CSS set may be set to be higher than the priority of the first USS set. If the content carried in the DCI corresponding to the power saving signal is common content, the priority of the second CSS set may be set to be lower than the priority of the first USS set. The foregoing solution enables the network device to flexibly send the power saving signal.

Optionally, the method further includes: determining the priorities of the second CSS set and the first USS set based on a value of an index number of the second CSS set and a value of an index number of the first USS set.

Optionally, the method further includes: determining a first CSS set; and sending a fourth PDCCH on a downlink control channel candidate resource of the first CSS set, where a priority of the first CSS set is higher than a priority of the second CSS set.

Optionally, an identifier of the second USS set is the larger one of an identifier of the first USS set and an identifier of the second USS set.

Optionally, the method includes: sending the first PDCCH and the second PDCCH on the downlink control channel candidate resources of the first USS set and the second USS set in a discontinuous reception DRX active time.

Optionally, the method further includes: sending the second PDCCH and the third PDCCH on the downlink control channel candidate resources of the second CSS set and the second USS set in a discontinuous reception DRX active time.

According to a seventh aspect, this application provides a communications apparatus. The apparatus may be a terminal device, or may be a chip in a terminal device. The apparatus may include a processing unit and a transceiver unit. When the apparatus is a terminal device, the processing unit may be a processor, and the transceiver unit may be a transceiver. The terminal device may further include a storage unit, and the storage unit may be a memory. The storage unit is configured to store instructions, and the processing unit executes the instructions stored in the storage unit, so that the terminal device performs the method according to the first aspect or the second aspect. When the apparatus is a chip in a terminal device, the processing unit may be a processor, and the transceiver unit may be an input/output interface, a pin, a circuit, or the like. The processing unit executes instructions stored in a storage unit, so that the terminal device performs the method according to the first aspect, the second aspect, or the fifth aspect. The storage unit may be a storage unit (for example, a register or a cache) in the chip, or may be a storage unit (for example, a read-only memory or a random access memory) outside the chip in the terminal device.

According to an eighth aspect, this application provides another communications apparatus. The apparatus may be a network device, or may be a chip in a network device. The apparatus may include a processing unit and a transceiver unit. When the apparatus is a network device, the processing unit may be a processor, and the transceiver unit may be a transceiver. The network device may further include a storage unit, and the storage unit may be a memory. The storage unit is configured to store instructions, and the processing unit executes the instructions stored in the storage unit, so that the network device performs the method according to the third aspect or the fourth aspect. When the apparatus is a chip in a network device, the processing unit may be a processor, and the transceiver unit may be an input/output interface, a pin, a circuit, or the like. The processing unit executes instructions stored in a storage unit, so that the network device performs the method according to the third aspect, the fourth aspect, or the sixth aspect. The storage unit may be a storage unit (for example, a register or a cache) in the chip, or may be a storage unit (for example, a read-only memory or a random access memory) outside the chip in the network device.

According to a ninth aspect, this application provides a computer-readable storage medium. The computer-readable storage medium stores a computer program, and when the computer program is executed by a processor, the processor is enabled to perform the method according to the first aspect, the second aspect, or the fifth aspect.

According to a tenth aspect, this application provides another computer-readable storage medium. The computer-readable storage medium stores a computer program, and when the computer program is executed by a processor, the processor is enabled to perform the method according to the third aspect, the fourth aspect, or the sixth aspect.

According to an eleventh aspect, this application provides a computer program product. The computer program product includes computer program code, and when the computer program code is run by a processor, the processor is enabled to perform the method according to the first aspect, the second aspect, or the fifth aspect.

According to a twelfth aspect, this application provides another computer program product. The computer program product includes computer program code, and when the computer program code is run by a processor, the processor is enabled to perform the method according to the third aspect, the fourth aspect, or the sixth aspect.

DETAILED DESCRIPTION OF EMBODIMENTS

The following describes the technical solutions in this application with reference to the accompanying drawings.

Figure 1:
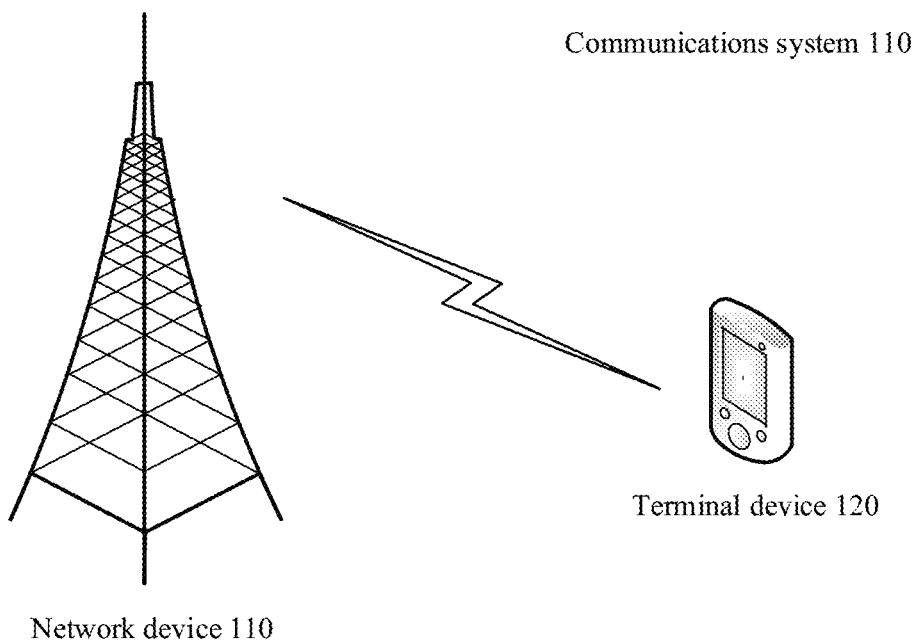
FIG. 1 is a schematic diagram of a communications system applicable to this application.

First, an application scenario of this application is described. FIG. 1 is a schematic diagram of a communications system applicable to this application.

A communications system 100 includes a network device 110 and a terminal device 120. The terminal device 120 communicates with the network device 110 by using an electromagnetic wave. To be specific, the terminal device 120 may send data to the network device 110, or the network device 110 may send data to the terminal device 120.

In this application, the terminal device 120 may include various handheld devices, vehicle-mounted devices, wearable devices, computing devices that have a wireless communication function, or other processing devices connected to a wireless modem, for example, user equipment (user equipment, UE) defined in 3rd generation partnership project (3rd generation partnership project, 3GPP), a mobile station (mobile station, MS), a soft terminal, a home gateway, a set-top box. A chip used in the foregoing device may also be referred to as a terminal device.

The network device 110 may be a base station defined in 3GPP, for example, a base station (new generation NodeB, gNB) in a 5G mobile communications system. The network device 110 may alternatively be a non-3GPP (non-3GPP) access network device, for example, an access gateway (access gateway, AG). The network device may alternatively be a relay station, an access point, a vehicle-mounted device, a wearable device, or a device of another type. A chip used in the foregoing device may also be referred to as a network device.

As an example instead of a limitation, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

The communications system shown in FIG. 1 is merely an example for description, and a communications system applicable to this application is not limited thereto.

In the communications system 100, a process in which the terminal device 120 sends data to the network device 110 may be referred to as uplink transmission, and a process in which the network device 110 sends data to the terminal device 120 may be referred to as downlink transmission. For brevity, no reference numeral is attached to the following terminal device and network device.

Figure 2:
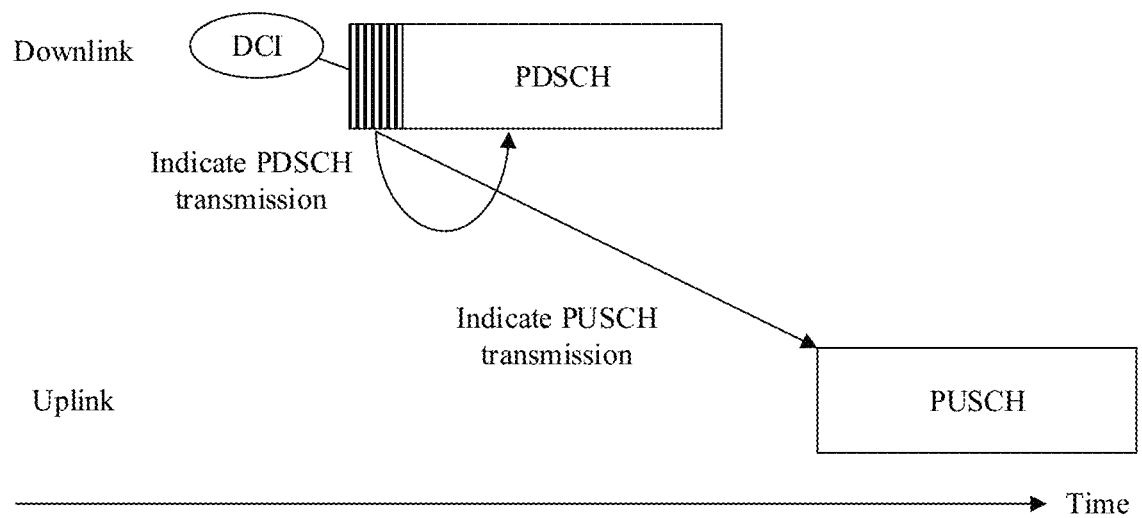
FIG. 2 is a schematic diagram of a transmission manner applicable to this application.

For the uplink transmission, if the uplink transmission is based on dynamic scheduling, as shown in FIG. 2, the terminal device receives downlink control information (downlink control information, DCI) sent by the network device, where indication information such as a time domain resource and a frequency domain resource that are occupied by a physical uplink shared channel (physical uplink shared channel, PUSCH) and a modulation scheme is carried in the DCI. After receiving the DCI, the terminal device may determine a specific time domain resource and frequency domain resource on which the PUSCH is sent, and then perform preparation steps for sending the PUSCH. The preparation steps generally include: information encoding, modulation, resource mapping, Fourier transform, and the like. Finally, the terminal device sends a prepared PUSCH on the time domain resource and the frequency domain resource that are indicated by the DCI.

For the downlink transmission, if the downlink transmission is based on dynamic scheduling, as shown in FIG. 2, the terminal device receives DCI sent by the network device, where indication information such as a time domain resource and a frequency domain resource that are occupied by a physical downlink shared channel (physical downlink shared channel, PDSCH) and a modulation scheme is carried in the DCI. After receiving the DCI, the terminal device performs decoding processing on the PDSCH. A decoding processing process generally includes resource demapping, inverse Fourier transform, demodulation, decoding, and the like. If a final decoding result is correct, reception is correct. If a final decoding result is incorrect, reception fails.

It should be noted that DCI is generally carried on a physical downlink control channel (physical downlink control channel, PDCCH). The PDCCH is equivalent to a carrier, and content carried on the PDCCH is the DCI. Because the PDCCH and the DCI are in a one-to-one correspondence, descriptions of receiving (or "monitoring") the PDCCH are equivalent to descriptions of receiving the DCI.

The PDCCH is transmitted in a control resource set (control resource set, CORESET). The CORESET includes several physical resource blocks (physical resource blocks, PRBs) in frequency domain, includes several (for example, one to three) OFDM symbols in time domain, and may be located at any position in a slot (slot). Each of the PRBs includes 12 consecutive subcarriers in frequency domain, as shown in FIG. 3.

Figure 3:
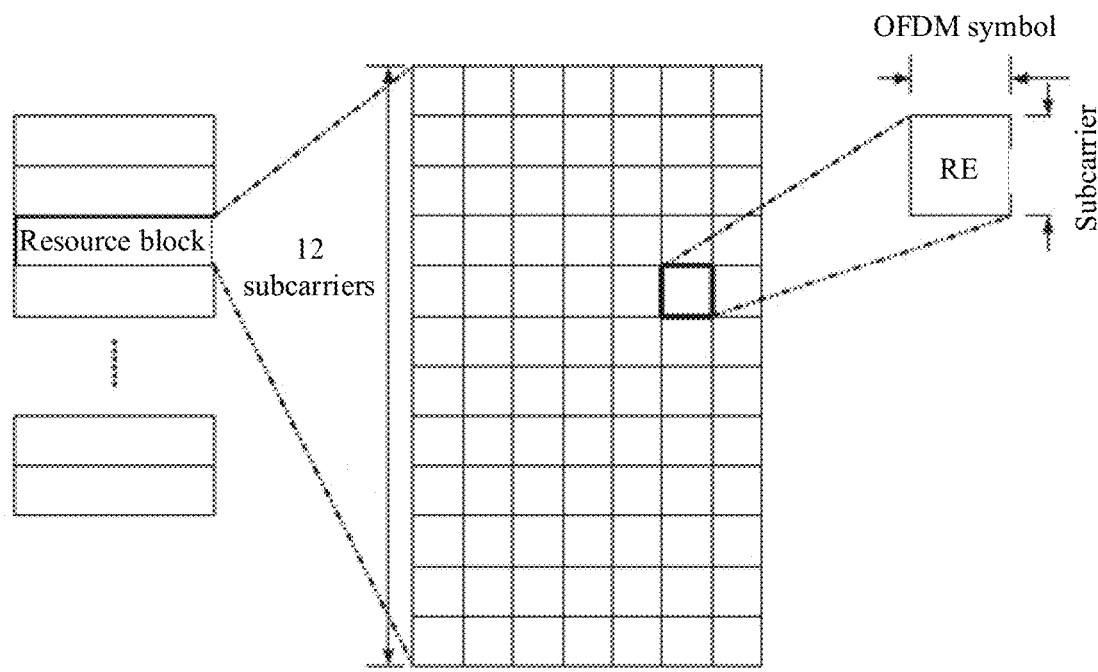
FIG. 3 is a schematic diagram of a physical transmission resource.

In FIG. 3, each rectangle represents one resource element (resource element, RE). The RE is a minimum physical resource and includes a subcarrier in an orthogonal frequency division multiplexing (orthogonal frequency division multiplexing, OFDM) symbol. In a 5G mobile communications system, a basic time unit for resource scheduling is a slot (slot). Generally, one slot includes 14 OFDM symbols in time. One subframe (subframe) includes one or more slots. For example, when a subcarrier spacing is 15 kHz, each subframe includes one slot. One frame (frame) includes 10 subframes, and each frame is identified by a system frame number (system frame number, SFN). A periodicity of the SFN is equal to 1024 frames. Therefore, the SFN automatically repeats after 1024 frames.

Figure 4:
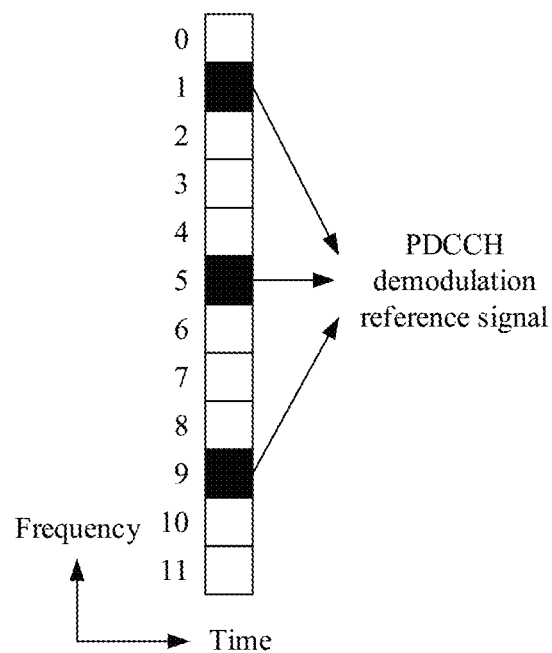
FIG. 4 is a schematic diagram of a resource group.

One resource element group (resource element group, REG) includes one OFDM symbol in time domain and 12 subcarriers in frequency domain, that is, one REG includes 12 REs. As shown in FIG. 4, in the 12 REs, three REs may be used to map a PDCCH demodulation reference signal, and the remaining nine REs are used to map DCI. The nine REs are some physical resources included in a PDCCH.

The PDCCH may be further divided into control channel elements (control channel elements, CCEs). Each CCE corresponds to six REGs. Therefore, one CCE includes 72 REs, where 18 REs are used for DMRS transmission, and 54 REs are used for DCI transmission. In a CORESET, each CCE has one corresponding index number, and the index number of each CCE corresponds to index numbers of six REGs mapped to the CCE.

One given PDCCH may include one, two, four, eight, or 16 CCEs, and a quantity of CCEs is determined by a DCI payload size (DCI payload size) and a required coding rate. A quantity of CCEs included in a PDCCH is also referred to as an aggregation level (aggregation level, AL).

A search space (search space, SS) is a set of PDCCH candidates (PDCCH candidates) at one aggregation level. Because an aggregation level of a PDCCH actually sent by the network device changes with time, and no related signaling is used to notify the terminal device, the terminal device needs to perform blind detection on the PDCCH at different aggregation levels. A PDCCH to be blindly detected is referred to as a PDCCH candidate. UE decodes all PDCCH candidates in a search space. If a cyclic redundancy check (cyclic redundancy check, CRC) of the PDCCH succeeds, it is considered that content carried on the decoded PDCCH is valid for the UE, and related information after decoding is processed.

The following describes how the terminal device monitors a control channel based on a search space, that is, how the terminal device determines a CCE index number of a PDCCH candidate.

In the foregoing description of the search space, the PDCCH may support a plurality of aggregation level values, and the information cannot be obtained by the terminal device in advance. Therefore, the terminal device needs to perform blind detection on the PDCCH. Based on the definition of the search space described above, the UE monitors the PDCCH at a time-frequency position corresponding to limited CCEs, thereby avoiding increase in complexity of blind detection. To better control the complexity of blind detection, search space configuration flexibility, that is, an aggregation level, is further improved in the 5G mobile communications system. Both a quantity of PDCCH candidates corresponding to the aggregation level and a monitoring periodicity of the search space in time domain may be configured by using a higher layer parameter. The terminal device may flexibly control the complexity of blind detection based on the configuration information.

The network device may configure one or more search space sets for the terminal device, where each of the search space sets includes a search space at one or more aggregation levels. Configuration information of the search space set is shown in Table 1.

TABLE 1

| Configuration parameter | Content |
| --- | --- |
| Search space set index | Search space set identifier (identification, ID) |
| Control resource set index | A CORESET associated with a search space set, and the associated CORESET determines a physical resource of the search space set |
| Search space set type | Common search space or UE-specific search space |
| Aggregation level value | Aggregation level information included in a search space set, and a value range is {1, 2, 4, 8, 16} |
| Candidate control channel quantity | A quantity of PDCCH candidates in a search space corresponding to each aggregation level |
| Monitoring periodicity | A time interval at which a search space set is monitored, and a unit is a slot |
| Slot offset | A slot offset between a starting point of a monitoring periodicity and a starting point of actually monitoring a search space set, and the offset is less than a value of the monitoring periodicity |
| Slot quantity | A quantity of slots in which search space sets are continuously monitored, and the slot quantity is less than a value of the monitoring periodicity |
| Symbol position | A position of a start symbol of a CORESET associated with a search space set in each slot, and an interval between two adjacent start symbol positions is greater than or equal to a quantity of CORESET time domain symbols |

Figure 5:
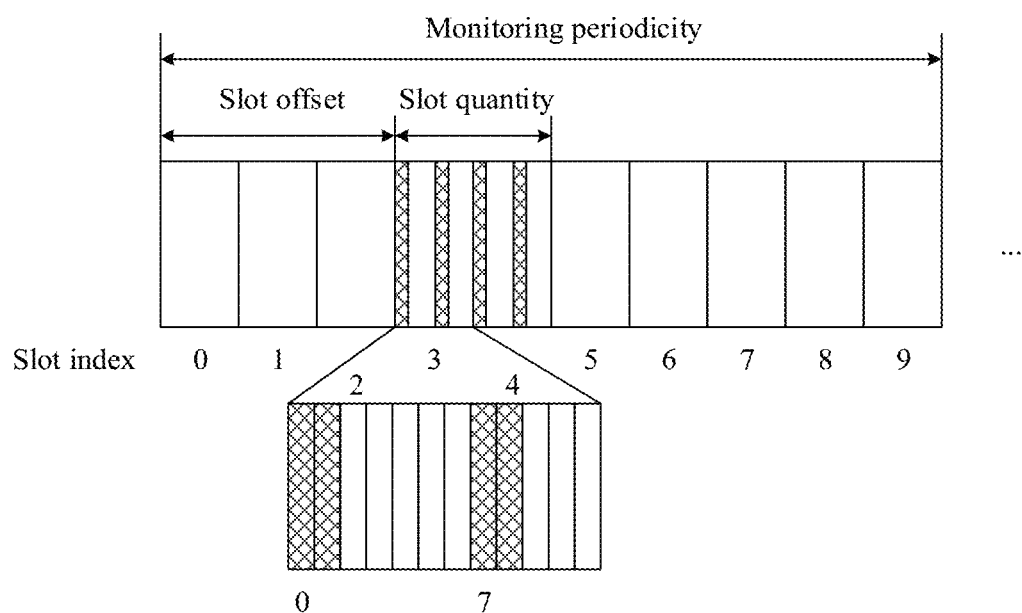
FIG. 5 is a schematic diagram of a search space set.

FIG. 5 is a schematic diagram of a search space set. A monitoring periodicity is 10 slots, a slot offset is three slots, a slot quantity is two slots, and a control resource set index corresponds to a CORESET that occupies two OFDM symbols. Symbol positions are an OFDM symbol 0 and an OFDM symbol 7 in a slot. In the foregoing example, UE starts to monitor a control channel candidate on a search space set from a symbol 0 and a symbol 7 in a slot 3 and a slot 4 in each monitoring periodicity, and a CORESET occupies two OFDM symbols in time domain.

Search space sets may be classified into two types: a common search space (common search space, CSS) set and a specific search space (specific search space, USS) set. A PDCCH in the CSS set is mainly used to indicate to transmit a system message, a random access response message, a paging message, and the like. The CSS set may be a search space set including the following types of PDCCHs: a type 0, a type 0A, a type 1, a type 2, and a type 3, and a search space set including the PDCCH of the type may be referred to as a Type 0/0A/1/2/3-PDCCH CSS set. A PDCCH in the USS set is used to schedule a specific terminal device to transmit uplink data and/or downlink data.

Different types of downlink control information, such as scheduling downlink/uplink data transmission, a power control command, a slot format indication, and a resource preemption indication, generally correspond to different DCI sizes. Therefore, the DCI is classified into different formats based on a type of indication information, and each format corresponds to one DCI size (DCI size, that is, a quantity of source bits carried in the DCI) or parsing mode. A DCI format (DCI format) supported in NR is shown in Table 2. When configuring a search space set, a base station configures a DCI format of the search space set, for example, format 0_1/1_1.

A DCI format supported in the 5G mobile communications system is shown in Table 2. When configuring a search space set, a network device configures a DCI format of the search space set.

TABLE 2

| | Usage | | | | |
| --- | --- | --- | --- | --- | --- |
| Format | Uplink scheduling | Downlink scheduling | Power control command | Slot format indication | Resource occupation indication |
| 0_0 | √ | | | | |
| 0_1 | √ | | | | |
| 1_0 | | √ | | | |
| 1_1 | | √ | | | |
| 2_0 | | | | √ | |
| 2_1 | | | | | √ |
| 2_2 | | | √ | | |
| 2_3 | | | √ | | |

CRCs of DCI that has different functions may be scrambled by using different radio network temporary identifiers (radio network temporary identifiers, RNTIs). For example, a CRC of DCI monitored by the terminal device in a Type 0-PDCCH CSS set and a CRC of DCI monitored by the terminal device in a Type 0A-PDCCH CSS set are scrambled by using a system information (system information, SI)-RNTI. The DCI is used to schedule the system message, for example, a system information block (system information block, SIB) 1, and a format of the DCI is a format 1_0.

The terminal device may further determine, based on configuration information of a search space set, a CCE index of each PDCCH candidate in a configured PDCCH candidate set in a CORESET. The CCE index of the PDCCH candidate in the CORESET may be determined based on a given search space function. For example, a CCE index of a PDCCH candidate $m_{s,n_{CI}}$ at an aggregation level of L of a search space set s (determined based on a search space set index parameter in Table 1) associated with a control resource set p (determined based on a control resource set index parameter in Table 1) in a slot $n_{s,f}^{\mu}$ is given by the following formula:

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i, \text{ and}$$

$$i = 0, 1, \ldots, L-1$$

In the foregoing formula, for a CSS, $Y_{p,n_{s,f}^{\mu}}=0$; and for a USS, $Y_{p,n_{s,f}^{\mu}}=(A_p \cdot Y_{p,n_{s,f}-1^{\mu}}) \bmod D$, $Y_{p,-1}=n_{RNTI} \neq 0$, and D=65537. When p mod 3=2, $A_0=39827$; when p mod 3=1, $A_0=39829$; and when p mod 3=2, $A_2=39839$. $N_{CCE,p}$ is a total quantity of CCEs included in the control resource set p, and the CCEs are numbered from 0 to $N_{CCE,p}-1$.

Figure 6:
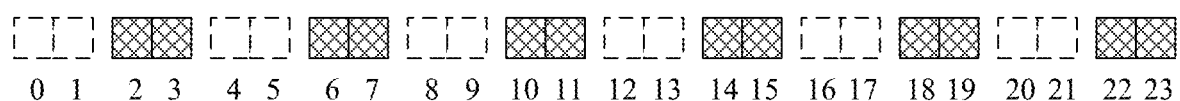
FIG. 6 is a schematic diagram of a correspondence between a PDCCH candidate and a CCE set when an aggregation level is 2.

If a cross-carrier indicator is not configured, $n_{CI}=0$. If a cross-carrier indicator is configured, $n_{CI}$ is a configured carrier indication parameter, to ensure that PDCCH candidates for scheduling different carriers occupy non-overlapped CCEs as much as possible. $m_{s,n_{CI}}=0, \ldots, M_{p,s,n_{CI}}^{(L)}-1$, and $M_{p,s,n_{CI}}^{(L)}$ is a configured quantity of control channel candidates at an aggregation level of L of a search space sets in a serving cell $n_{CI}$, and may be determined by using a control channel candidate quantity parameter in Table 1. For the CSS, $M_{p,s,max}^{(L)}=M_{p,s,0}$; and for the USS, $M_{p,s,max}^{(L)}$, is a maximum value of all $n_{CI}$ corresponding to the aggregation level L in the search space sets in the control channel resource set p. If there are 24 CCEs in the CORESET, and a quantity of PDCCH candidates in a search space corresponding to an aggregation level AL=2 is 6, a CCE index number of each PDCCH candidate is shown in FIG. 6.

To reduce complexity of monitoring the PDCCH by the terminal device, an upper limit of a blind detection capability of the terminal device is defined in the 5G mobile communications system. The blind detection capability includes a quantity of PDCCH candidates monitored in each slot and a quantity of non-overlapped CCEs monitored in each slot, as shown in Table 3.

TABLE 3

| Subcarrier width (kHz) | Maximum quantity of PDCCH candidates in each slot | Maximum quantity of non-overlapped CCEs in each slot |
| --- | --- | --- |
| 15 | 44 | 56 |
| 30 | 36 | 56 |
| 60 | 22 | 48 |
| 120 | 20 | 32 |

The maximum quantity of PDCCH candidates limits complexity of blind detection and decoding performed by the terminal device, and the maximum quantity of non-overlapped CCEs limits complexity of channel estimation performed by the terminal device. In one slot, the terminal device needs to determine, based on the upper limit of the blind detection capability, a search space set that needs to be monitored.

It should be noted that, if a PDCCH candidate of one search space set and a PDCCH candidate of another search space set are located in a same CORESET, the two PDCCH candidates have a same CCE set (that is, quantities of included CCEs are the same, and corresponding CCE indexes are the same) and a same PDCCH scrambling sequence (PDCCH scrambling sequence), and sizes of DCI carried on the two PDCCH candidates are the same, the terminal device may calculate the two PDCCH candidates as a same monitored PDCCH candidate (monitored PDCCH candidate). Otherwise, the two PDCCH candidates are different monitored PDCCH candidates.

Generally, if the UE needs to monitor a plurality of PDCCH candidates of a same CORESET on a same CCE, the UE calculates the CCEs as only one non-overlapped CCE for the PDCCH candidates. However, it should be noted that if two PDCCH candidates are located in different CORESETs (for example, indexes of CORESETs in which the PDCCH candidates are located are different), or the UE receives corresponding PDCCH candidates on different start symbols (for example, the PDCCH candidates are located in a same CORESET, but are located at different symbol positions in a slot), CCEs of the two PDCCH candidates are non-overlapped (non-overlapped) CCEs.

The following briefly describes a PS signal in this application.

Data packet transmission is usually bursty. There is a to-be-transmitted data packet in a period of time, and there may be no to-be-transmitted data packet in another period of time. Therefore, a terminal device in the 5G mobile communications system receives a data packet based on a DRX mechanism. In a DRX cycle, the terminal device usually turns on a receiving circuit only in a part of a time period to monitor a downlink control channel, thereby reducing power consumption of the terminal device.

Figure 7:
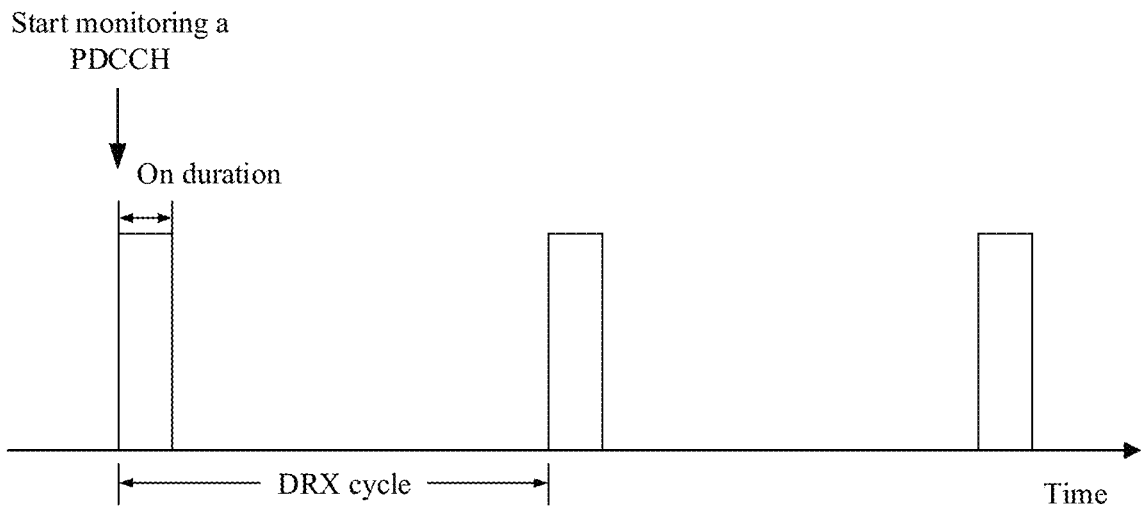
FIG. 7 is a schematic diagram of a DRX mechanism.

FIG. 7 is a schematic diagram of a DRX mechanism.

Figure 8:
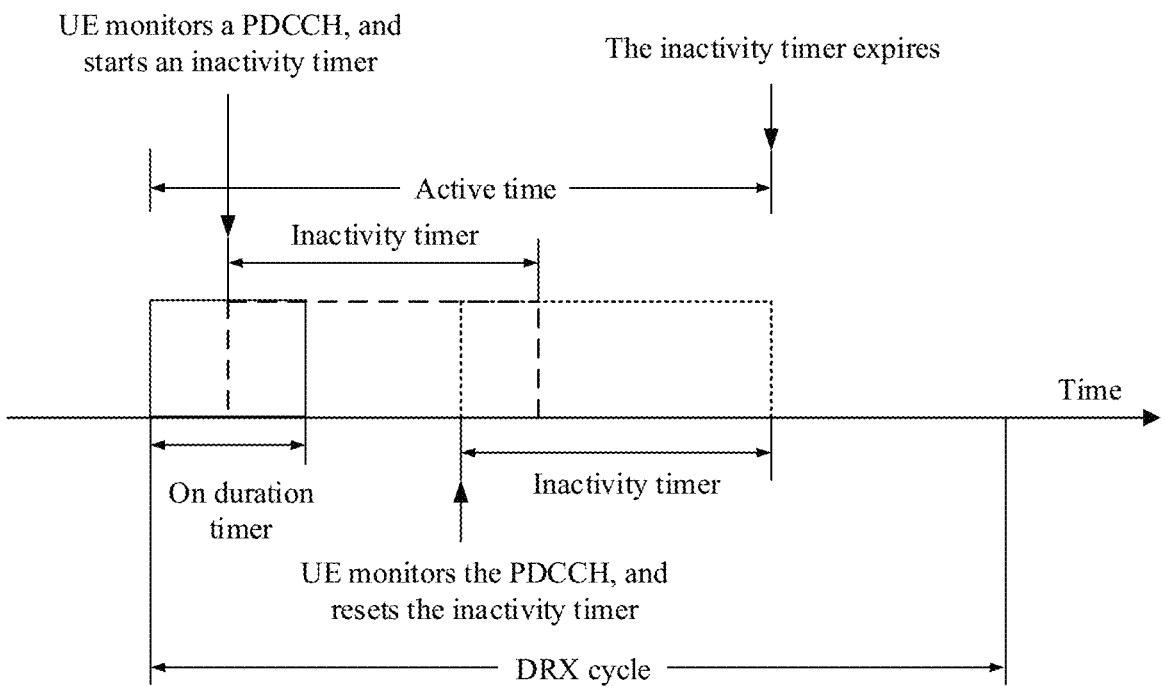
FIG. 8 is another schematic diagram of the DRX mechanism.

A network device may configure a DRX cycle (DRX cycle) for a terminal device in a connected state, and each DRX cycle includes "on duration (on duration)". In the on duration, the terminal device may monitor a PDCCH. The terminal device starts a timer at a time start position (namely, a time start position of the on duration) of each DRX cycle. A time length of the timer is a time length of the on duration, and the timer may be referred to as an on duration timer (drx-onDurationTimer). Duration of the on duration timer may range from 1 ms to 1200 ms. The terminal device monitors a PDCCH within the time range of the on duration timer. If the terminal device monitors no PDCCH within the time range of the on duration timer, when the on duration timer expires, the terminal device enters a sleep state. In other words, the terminal device may turn off the receiving circuit in a remaining time period of the DRX cycle, thereby reducing the power consumption. If the terminal device has monitored a PDCCH within the time range of the on duration timer, the terminal device starts an inactivity timer (drx-InactivityTimer) in the DRX mechanism. If the terminal device has monitored a PDCCH again in a running time of the inactivity timer, the UE resets (restarts) the inactivity timer and restarts timing. If the inactivity timer is running, even if the on duration timer expires (that is, the on duration ends), the terminal device still needs to continue to monitor a PDCCH until the inactivity timer expires, as shown in FIG. 8.

In the DRX mechanism, there are other timers, such as a DRX downlink retransmission timer (drx-RetransmissionTimerDL) and a DRX uplink retransmission timer (drx-RetransmissionTimerUL). If any one of the foregoing timers (including the on duration timer, the inactivity timer, the DRX downlink retransmission timer, the DRX uplink retransmission timer, and the like) is running, the terminal device is in an active time (active time). It should be noted that there may be some other cases in which the terminal device is in the active time. In the DRX mechanism, if the terminal device is in the active time, the terminal device needs to monitors a PDCCH.

In the DRX cycle, the terminal device needs to first wake up from the sleep state, enable a radio frequency circuit and a baseband circuit, obtain time-frequency synchronization, and then monitor a PDCCH in the on duration. These processes consume a lot of power. However, generally, data transmission is usually bursty and sparse in terms of time. If the network device does not schedule any data for the terminal device in the on duration, unnecessary power consumption occurs for the terminal device. Therefore, to reduce power consumption, a power saving signal is introduced into the 5G mobile communications system. The power saving signal may also be referred to as a power saving channel (power saving channel).

The terminal device may monitor the power saving signal out of the DRX active time (out of active time), which may be referred to as a power saving signal transmitted out of the active time. The power saving signal may function as a WUS, as shown in FIG. 9.

The following describes a function of the power saving signal by using a WUS.

For on duration in each DRX cycle, there is one WUS occasion (WUS occasion) before a start time domain position of the on duration. The network device may send a WUS (that is, a power saving signal) to the terminal device in a discontinuous transmission (discontinuous transmission, DTX) form on the WUS occasion. In other words, the network device determines, based on a data scheduling requirement, whether to send the WUS on the WUS occasion. The terminal device needs to determine, by monitoring the WUS on the WUS occasion, whether the network device sends the WUS. When the terminal device is in the sleep state, the WUS may be monitored and demodulated in an extremely low power consumption state, for example, only some functions of a modem are enabled or a simple receiving circuit is used.

Figure 9:
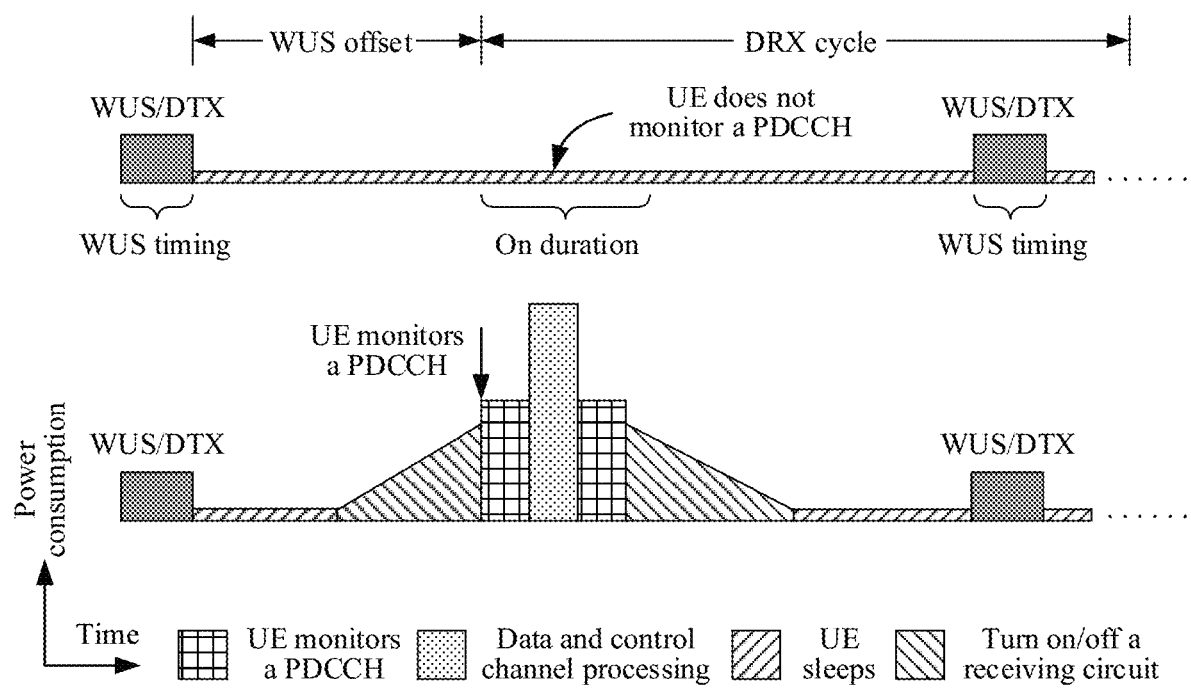
FIG. 9 is a schematic diagram of a power saving signal.

As shown in FIG. 9, when the terminal device monitors no WUS on the WUS occasion or a monitored WUS indicates that the UE has no data scheduling in the on duration, the terminal device may directly enter the sleep state, and does not need to monitor a PDCCH in the on duration. If the terminal device monitors a WUS on the WUS occasion or a monitored WUS indicates that the terminal device has data scheduling in the on duration, the terminal device wakes up from the sleep state, and may start the timer based on the foregoing DRX mechanism procedure to monitor a PDCCH. In this case, the terminal device needs sufficient time to enable all functions of the modem, so that the terminal device can monitor a PDCCH in the DRX cycle and receive a data channel. Therefore, there is a period of time between the WUS occasion and the on duration, and the period of time may be referred to as a WUS offset (WUS offset) or a gap value (gap value). Generally, a parameter T is used to represent the time interval. The parameter T may be configured by using higher layer signaling (a value ranges from several milliseconds to hundreds of milliseconds). The network device may determine the value of the parameter T based on a capability reported by the terminal device. In addition, the power saving signal transmitted out of the active time may include some pieces of power saving information, and the power saving information may be one or more of the following information: a BWP ID, a cross-slot or same-slot scheduling (cross-slot or same-slot scheduling) indication, an RS transmission indication (including a CSI-RS or a TRS), a CSI reporting indication, a single-carrier or multi-carrier indication (that is, whether the UE receives data by using a plurality of carriers is indicated), information indicating whether the UE monitors a PDCCH in a DRX active time, information indicating whether the UE "wakes up", and the like.

Figure 10:
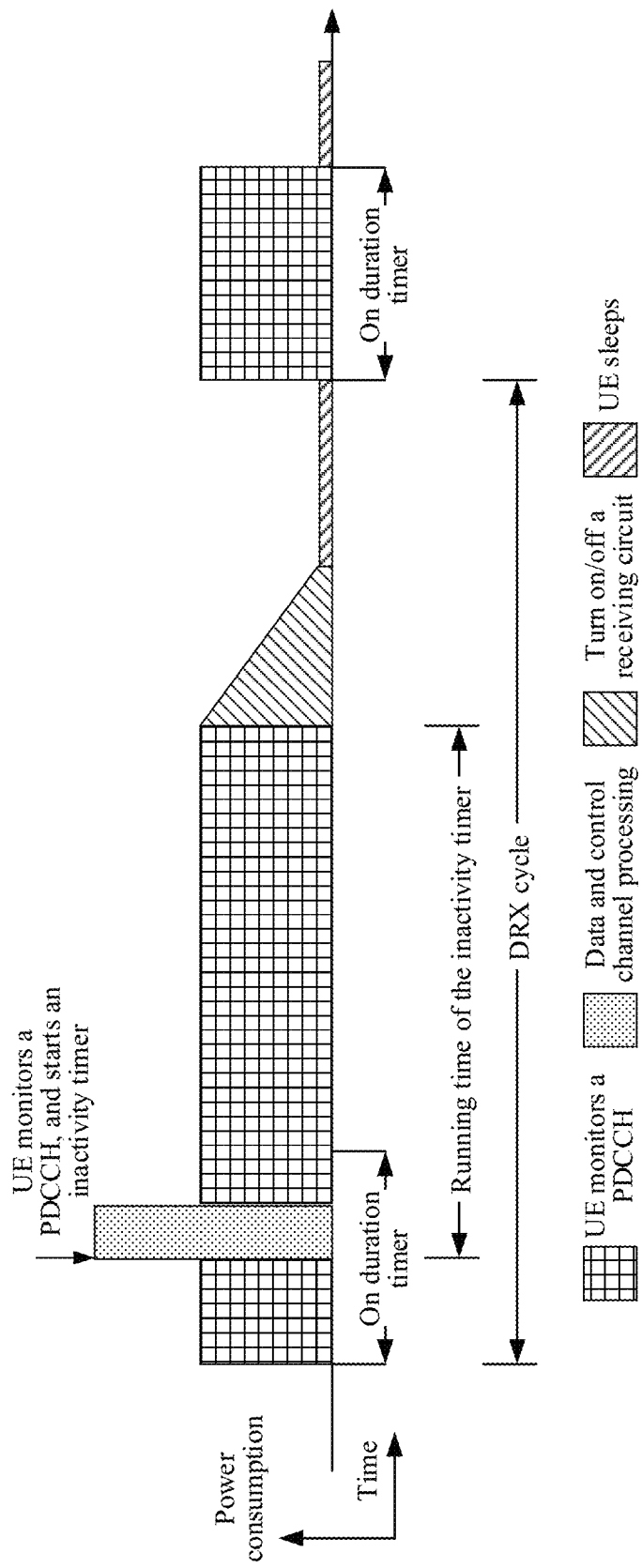
FIG. 10 is another schematic diagram of the power saving signal.

In the DRX mechanism, if the terminal device has monitored a PDCCH in a running time of the on duration timer, the terminal device starts an inactivity timer. In consideration of a latency requirement for scheduling data, a running time of the inactivity timer is generally much longer than the running time of the on duration timer. After starting or resetting the inactivity timer, the terminal device continues to monitor a PDCCH in a very long period of time. In this period of time, the network device may not schedule any data for the terminal device. As shown in FIG. 10, unnecessary power consumption occurs for the terminal device in this period of time.

To reduce power consumption, the terminal device may monitor the power saving signal in the DRX active time. The network device sends the power saving signal to the terminal device in a DTX form in the running time (namely, the active time) of the on duration timer or the inactivity timer of the terminal device. In other words, the network device determines, based on a data scheduling requirement, whether to send the power saving signal. The terminal device needs to determine, by monitoring the power saving signal, whether the network device sends the power saving signal. The power saving signal transmitted in the active time may also include some pieces of power saving information, and the power saving information may be one or more of the following information: a CORESET of a PDCCH, a search space set, or a PDCCH candidate that the terminal device needs to monitor or stop monitoring; a periodicity in which the terminal device monitors a search space set; a periodicity in which the terminal device monitors a PDCCH (PDCCH monitoring periodicity); a period of time in which the terminal device stops monitoring a PDCCH (PDCCH skipping); a quantity of receive antennas or a quantity of multiple-input multiple-output (multiple-input multiple-output, MIMO) layers of the terminal device; a carrier (for example, the carrier may be a secondary component carrier, an SCell) of a PDCCH that the terminal device needs to monitor or stop monitoring. The following descriptions use an example in which the power saving signal indicates the period of time in which the terminal device stops monitoring the PDCCH (PDCCH skipping).

Figure 11:
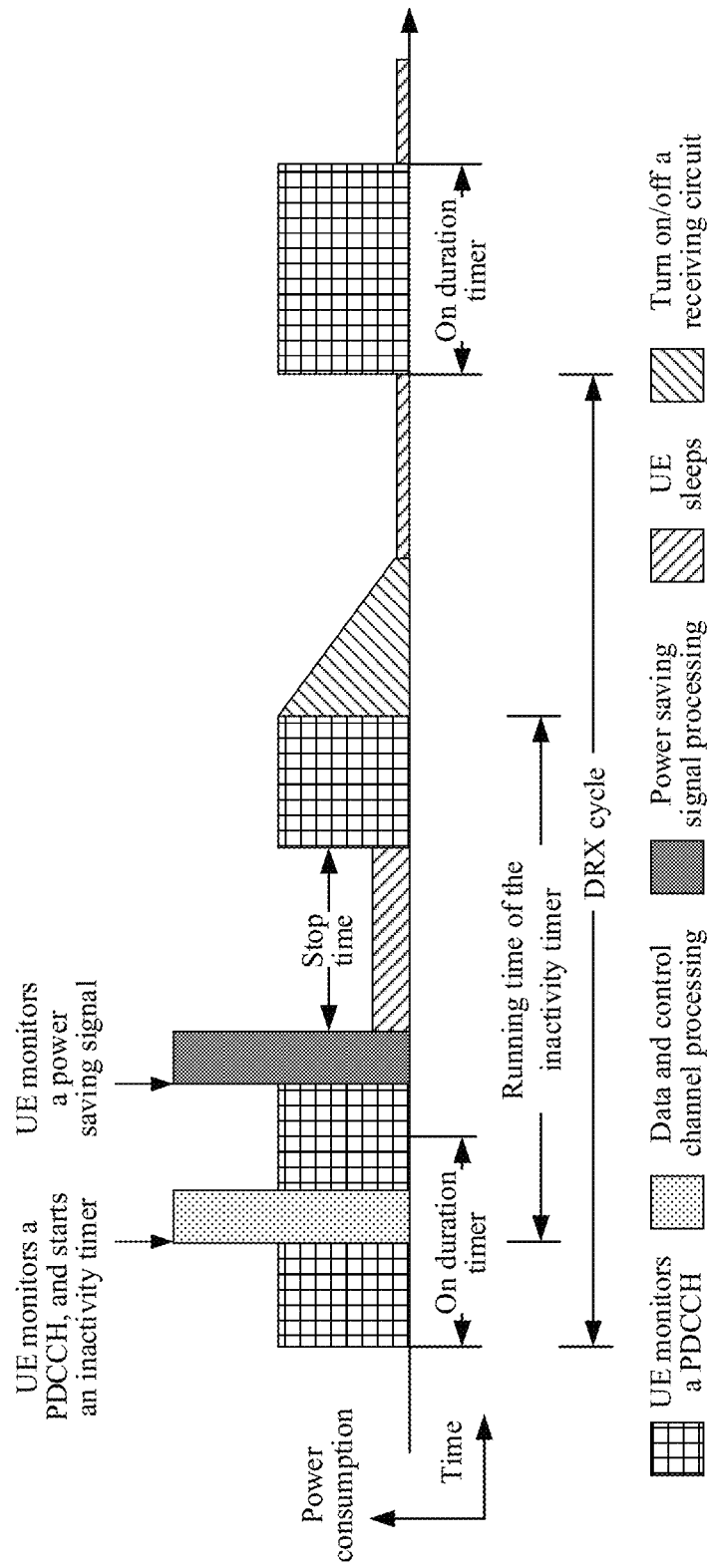
FIG. 11 is still another schematic diagram of the power saving signal.

The power saving signal may indicate the period of time in which the terminal device stops monitoring the PDCCH, and the period of time may be referred to as "skipping duration" (skipping duration). As shown in FIG. 11, for the network device, if the network device determines that no data needs to be scheduled for the terminal device and no PDCCH needs to be sent in a continuous period of time after a "power saving signal occasion", the network device may send a corresponding power saving signal to the terminal device. For the terminal device, if the terminal device has monitored a power saving signal on the "power saving signal occasion" or a monitored power saving signal indicates that the terminal device has no data scheduling in corresponding "skipping duration", the terminal device may not monitor a PDCCH in the "skipping duration". Alternatively, the terminal device does not monitor a PDCCH on a PDCCH monitoring occasion (PDCCH monitoring occasion) in the "skipping duration", and enters the sleep state, but in this case, the UE is still in the active time. The terminal device may enter a wake-up state after the "skipping duration" to monitor a power saving signal or a PDCCH. If the terminal device monitors no power saving signal on the "power saving signal occasion" or a monitored power saving signal indicates that the terminal device has data scheduling in corresponding "skipping duration", the terminal device continues to monitor a PDCCH. In this manner, unnecessary power consumption of the terminal device can be reduced.

To reduce complexity of monitoring the power saving signal by the terminal device, the power saving signal may be designed as a downlink control channel, and the power saving signal may be referred to as a PDCCH-based power saving signal/channel (PDCCH-based power saving signal/channel, PDCCH-based power saving signal for short below). The PDCCH-based power saving signal may be a UE-specific PDCCH. However, to reduce network side resource consumption, the PDCCH-based power saving signal may alternatively be designed as a UE group downlink control channel (UE group PDCCH), and a base station configures a group of UEs to monitor a same group of PDCCHs. The group of PDCCHs carries group DCI, and the group DCI is used to indicate corresponding power saving information (for example, whether the UE needs to be "woken up") of each UE in the group of UEs. The group DCI includes a plurality of information bits/information blocks, and each of the information bits/information blocks may correspond to one UE in the group of UEs. For a power saving signal monitored in or out of the DRX active time, an information field in DCI carried by the PDCCH-based power saving signal may include the foregoing power saving information.

In an existing NR standard, the UE determines, based on the following search space set (search space set, SS set) priority method, an SS set that needs to be monitored, so that a maximum quantity of control channel candidates and a maximum quantity of non-overlapped CCEs are not exceeded. The following explains a meaning of a priority of an SS set and a method for determining an SS set that needs to be monitored. Herein, "monitoring a search space set" means monitoring a PDCCH on a control channel candidate resource in a search space.

Step 1: The UE first determines that there is a search space set that may need to be monitored in the slot.

Step 2: If a CSS set takes precedence over a USS set, the UE preferentially determines the CSS set as an SS set that needs to be monitored, where a priority of the CSS set is higher than a priority of the USS set.

Step 3: In a configured USS set, a search space set with a smaller ID number (see Table 1) takes precedence over a search space set with a larger ID number.

Starting from a USS set with a smallest ID number, the UE determines, in ascending order of ID numbers, whether USS sets corresponding to the ID numbers are USS sets that need to be monitored. For a USS set with a specific number, monitoring the USS set by the UE may increase a quantity of PDCCH candidates that the UE needs to monitor and a quantity of non-overlapped CCEs that the UE needs to monitor. If the UE monitors, in the slot, the USS set and the SS set determined to be monitored (including the CSS set and the USS set determined to be monitored, and the SS set takes precedence over the USS set), and either of two indicators in Table 3 is exceeded, the UE does not determine the USS set as a USS set that needs to be monitored, and does not determine a USS set whose ID number is greater than that of the USS set as a USS set that needs to be monitored. Otherwise, the UE determines the USS set as a USS set that needs to be monitored. This may be referred to as that a priority of a USS set with a smaller ID number is higher than that of a USS set with a larger ID number.

Step 4: The base station needs to ensure that complexity of blindly detecting the CSS set does not exceed a maximum quantity value specified in Table 3, that is, the UE may determine the CSS set as an SS set that needs to be monitored.

In NR, because the UE needs to additionally monitor a search space set of a PDCCH-based power saving signal, a quantity of PDCCH candidates that need to be monitored by the UE in some slots and a quantity of non-overlapped CCEs that need to be monitored by the UE in some slots may be increased based on the foregoing existing method. Consequently, the UE may not monitor some search space sets, affecting scheduling of a PDSCH or sending of a power saving signal by the base station. Therefore, the terminal device needs a reliable power saving signal monitoring method.

Figure 12:
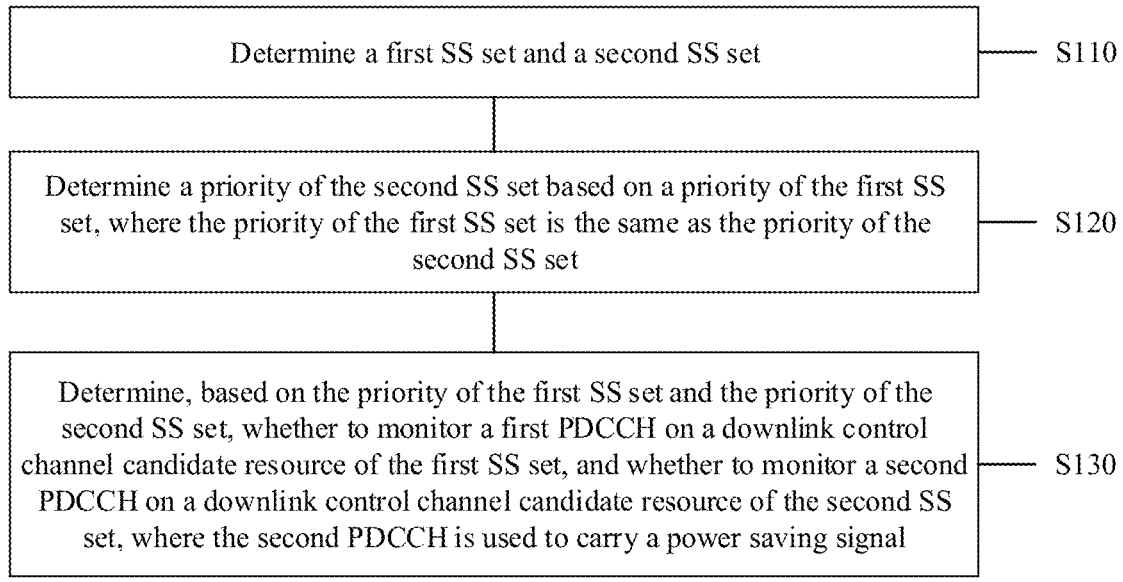
FIG. 12 is a schematic diagram of a downlink control channel monitoring method according to this application.

FIG. 12 shows a power saving signal monitoring method according to this application. The method may be applied to a terminal device, and the method includes the following steps.

S110: Determine a first SS set and a second SS set.

A downlink control channel candidate resource (namely, a PDCCH candidate) of the second SS set is used to transmit a PDCCH-based power saving signal, and DCI carried by the PDCCH-based power saving signal includes power saving information. A DCI format may be a new DCI format different from all the DCI formats in Table 2, for example, a DCI format 3_0. A downlink control channel candidate resource of the first SS set is used to transmit another PDCCH, where the another PDCCH is different from a PDCCH-based power saving signal, and a DCI format carried on the another PDCCH is an existing DCI format in existing NR R15 standards, and includes the DCI format in Table 2. The following uses a "PDCCH without a power saving signal" or an "R15 PDCCH" for representation. Alternatively, the downlink control channel candidate resource of the first SS set is used to transmit a PDCCH-based power saving signal. For example, the downlink control channel candidate resource of the second SS set is used to transmit a UE-specific (UE-specific) PDCCH-based power saving signal, and the downlink control channel candidate resource of the first SS set is used to transmit a UE group (UE group) PDCCH-based power saving signal. The following descriptions use an example in which a PDCCH without a power saving signal is transmitted by using the downlink control channel candidate resource of the first SS set. For brevity, the first SS set may be referred to as a new radio (new radio, NR) SS set, and the second SS set may be referred to as a PS SS set.

The terminal device may determine the first SS set and the second SS set at the same time, or may determine the first SS set and the second SS set in sequence. For a method for determining the first SS set and the second SS set, refer to the content described in Table 1.

S120: Determine a priority of the second SS set based on a priority of the first SS set, where the priority of the first SS set is the same as the priority of the second SS set.

For example, when configuring the second SS set, a base station configures an index number of the first SS set associated with the second SS set, and the UE directly determines the priority of the second SS set based on a type of the first SS set (for example, a CSS set or a USS set) or an ID number of the first SS set.

S130: Determine, based on the priority of the first SS set and the priority of the second SS set, whether to monitor a first physical downlink control channel PDCCH on a downlink control channel candidate resource of the first SS set, and whether to monitor a second PDCCH on a downlink control channel candidate resource of the second SS set, where the second PDCCH is used to carry a power saving signal.

The first PDCCH may be the foregoing "PDCCH without a power saving signal" or "R15 PDCCH", or may be a PDCCH carrying the power saving signal.

The second PDCCH is a PDCCH having a power saving signal function, and may be understood as the foregoing PDCCH-based power saving signal. DCI carried on the second PDCCH includes power saving information.

Alternatively, the first PDCCH or the second PDCCH may be another PDCCH, including a "PDCCH without a power saving signal" or an "R15 PDCCH", or a PDCCH with another function, for example, a function used for power saving of a base station, that is newly introduced when NR continues to evolve. This is not limited herein.

The terminal device may determine, based on the configuration information in Table 1, quantities of PDCCH candidates in the first SS set and the second SS set in a slot and CCEs of the PDCCH candidates.

The UE may determine, based on the foregoing SS set priority method, whether to monitor the first SS set and the second SS set. The following is an example.

In a slot, if the UE monitors, in the slot, the first SS set, the second SS set, and an SS set determined to be monitored (including the CSS set and the USS set determined to be monitored, where a priority of the SS set is higher than or equal to that of the first SS set), and a quantity of PDCCH candidates that the UE needs to monitor exceeds the maximum value shown in Table 3, or a quantity of non-overlapped CCEs that the UE needs to monitor exceeds the maximum value shown in Table 3, the terminal device may abandon monitoring the first PDCCH and the second PDCCH in the slot. For example, both the first SS set and the second SS set are USS sets.

In a slot, if the UE determines, based on the foregoing SS set priority method, not to monitor an SS set whose priority is higher than that of the first SS set, the UE does not monitor the first PDCCH and the second PDCCH in the slot. For example, both the first SS set and the second SS set are USS sets.

In a slot, if the UE monitors, in the slot, the first SS set, the second SS set, and another SS set determined to be monitored (including the CSS set and the USS set determined to be monitored, where a priority of the SS set is higher than or equal to that of the first SS set), a quantity of PDCCH candidates that the UE needs to monitor does not exceed the maximum value shown in Table 3, and a quantity of non-overlapped CCEs that the UE needs to monitor does not exceed the maximum value shown in Table 3, the terminal device may monitor the first PDCCH and the second PDCCH in the slot. For example, the first SS set is the CSS set. Because the CSS set has a highest priority, the UE directly determines that the first SS set and the second SS set are SS sets that need to be monitored. Alternatively, the first set is a USS set with a relatively small ID number.

Therefore, the terminal device may flexibly monitor the second PDCCH based on the priority of the PS SS set.

After determining the priority of the second SS set, the terminal device may monitor the second PDCCH on the downlink control channel candidate resource of the second SS set in a DRX active time.

Optionally, the first SS set and the second SS set meet at least one of the following three conditions:

The first PDCCH carries first DCI, the second PDCCH carries second DCI, and a size of the first DCI is the same as a size of the second DCI.

The downlink control channel candidate resource of the first SS set includes the downlink control channel candidate resource of the second SS set, and the first SS set and the second SS set are associated with a same CORESET. The UE monitors, in the associated CORESET, a PDCCH on the downlink control channel candidate resources of the first SS set and the second SS set.

Start symbols of the downlink control channel candidate resources in the first SS set and the second SS set in a slot are the same.

The sizes of the first DCI and the second DCI are the same, so that complexity of blind detection and decoding by the terminal device can be reduced. If the first SS set and the second SS set are associated with a same CORESET, scrambling sequences of the first PDCCH and the second PDCCH are the same. In addition, the downlink control channel candidate resource of the first SS set includes the downlink control channel candidate resource of the second SS set. Therefore, a quantity of control channel candidates monitored by the terminal device may not be increased, thereby reducing complexity of blind detection and decoding. The start symbols of the downlink control channel candidate resources in the first SS set and the second SS set in the slot are the same, so that a CCE of the first SS set and a CCE of the second SS set can be monitored as one CCE, thereby reducing complexity of channel estimation performed by the terminal device. Two SS sets that meet the foregoing condition may be referred to as SS sets that have an association relationship.

Therefore, impact of a newly added PS SS set on complexity of blind detection by the terminal device can be reduced or avoided by applying the foregoing solution. This helps the terminal device monitor a PDCCH-based power saving signal and another PDCCH in a slot.

The UE may distinguish the first DCI from the second DCI by using different RNTIs scrambled on CRCs.

Optionally, the first SS set includes m first downlink control channel candidates, the second SS set includes M second downlink control channel candidates, an aggregation level of the m first downlink control channel candidates is the same as that of the M second downlink control channel candidates, m and M are positive integers, m≤M, and indexes of the m first downlink control channel candidates are the same as indexes of the first m downlink control channel candidates of the M second downlink control channel candidates.

For example, there are m PDCCH candidates at an aggregation level of L in the second SS set, and there are M (m≤M) PDCCH candidates at an aggregation level of L in the associated first SS set. In this case, the PDCCH candidates at the aggregation level of L in the second SS set are m PDCCH candidates at the aggregation level of L in the associated first SS set (for example, PDCCH candidates numbered from 0 to m−1).

For example, there are two PDCCH candidates at an aggregation level of 2 in a PS SS set, and there are six PDCCH candidates at an aggregation level of 2 in a search space set (for example, an NR SS set) associated with the PS SS set. As shown in FIG. 6, in this case, the PDCCH candidates at the aggregation level of 2 in the PS SS set are a PDCCH candidate corresponding to CCE index numbers 2 and 3 and a PDCCH candidate corresponding to CCE index numbers 6 and 7 in FIG. 6.

Optionally, when the second SS set is a USS set, the first SS set is a USS set, a format of the first DCI is a format 1_0 or a format 0_0, and a CRC of the second DCI is scrambled by using a cell radio network temporary identifier (cell radio network temporary identifier, C-RNTI).

Because an excessive size of DCI carried on a PDCCH in the USS set affects monitoring performance of the terminal device, DCI of the power saving signal may be designed to be in a DCI format 1_0 or a DCI format 0_0. A size of DCI corresponding to the format 1_0 or the format 0_0 is relatively small. Therefore, a monitoring requirement of the terminal device can be met.

Optionally, when the second SS set is a CSS set, the first SS set is a CSS set, and a type of the first SS set is one of the following types: a type 0, a type 0A, a type 1, a type 2, and a type 3.

When a CSS set corresponding to the power saving signal is associated with another CSS set (that is, the first SS set), based on the type of the first SS set, a type of the power saving signal may be one of the foregoing five types.

For example, when the type of the first SS set is the type 2, the second SS set is also an SS set of the type 2, and a size of DCI corresponding to the power saving signal may be the same as a size of DCI that corresponds to a DCI format 1_0 and that is scrambled by using a paging radio network temporary identifier (paging radio network temporary identifier, P-RNTI).

For example, when the type of the first SS set is the type 3, the second SS set is also an SS set of the type 3, and a size of DCI corresponding to the power saving signal may be the same as a size of DCI that corresponds to a DCI format 2_0 and that is scrambled by using a slot format indicator radio network temporary identifier (slot format indicator radio network temporary identifier, SFI-RNTI).

Figure 13:
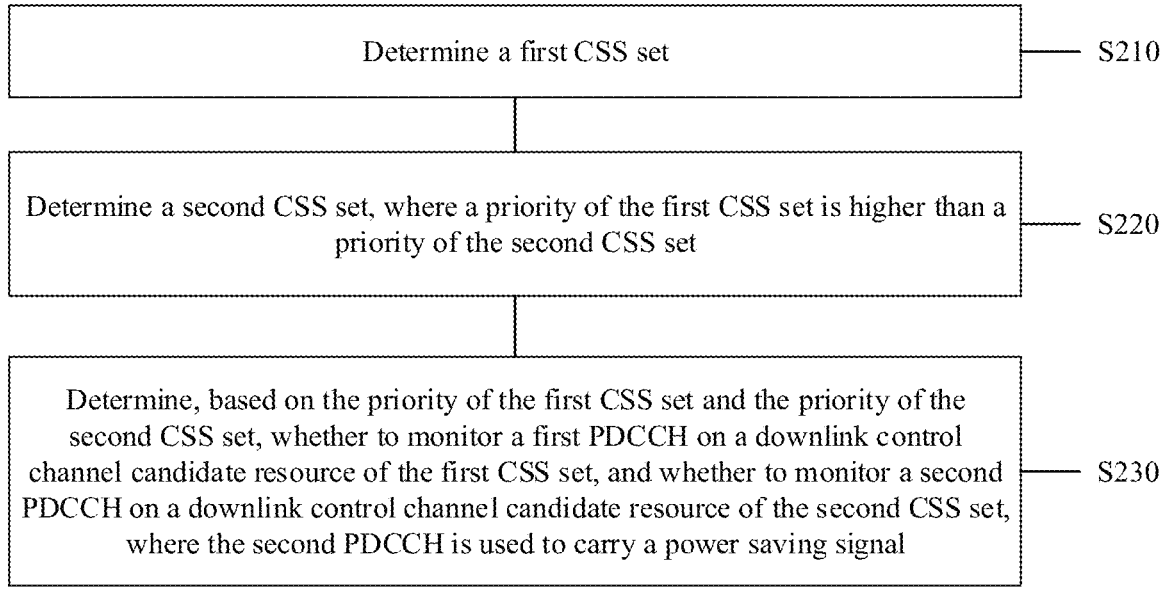
FIG. 13 is a schematic diagram of another downlink control channel monitoring method according to this application.

FIG. 13 shows another power saving signal monitoring method 200 according to this application. The method may be applied to a terminal device. The method 200 includes the following steps.

S210: Determine a first CSS set.

S220: Determine a second CSS set, where a priority of the first CSS set is higher than a priority of the second CSS set.

S230: Determine, based on the priority of the first CSS set and the priority of the second CSS set, whether to monitor a first physical downlink control channel PDCCH on a downlink control channel candidate resource of the first CSS set, and whether to monitor a second PDCCH on a downlink control channel candidate resource of the second CSS set, where the second PDCCH is used to carry a power saving signal.

The terminal device may determine the first CSS set and the second CSS set at the same time, or may determine the first CSS set and the second CSS set in sequence. For a method for determining the first CSS set and the second CSS set, refer to the content described in Table 1.

The first CSS set may be an existing CSS set in NR R15 standards, and a DCI format carried on the first PDCCH may be a DCI format carried on a control channel candidate resource in the existing CSS set in the NR R15 standards, such as a DCI format 2_0, 2_1, 2_2, or 2_3.

The terminal device may determine, based on the configuration information in Table 1, quantities of PDCCH candidates in the first CSS set and the second CSS set in a slot and CCEs of the PDCCH candidates.

In a slot, if the UE monitors the first CSS set and the second CSS set in the slot, and a quantity of PDCCH candidates monitored by the UE exceeds the maximum value shown in Table 3, or a quantity of non-overlapped CCEs monitored by the UE exceeds the maximum value shown in Table 3, the terminal device may monitor a first PDCCH and abandon monitoring a second PDCCH in the slot.

In a slot, if the UE monitors the first CSS set and the second CSS set in the slot, a quantity of PDCCH candidates monitored by the UE does not exceed the maximum value shown in Table 3, and a quantity of non-overlapped CCEs monitored by the UE does not exceed the maximum value shown in Table 3, the terminal device may monitor a first PDCCH and a second PDCCH in the slot.

Therefore, the terminal device may flexibly monitor the second PDCCH based on a priority of a PS CSS set, to avoid missing monitoring of an NR CSS set carrying more important information (for example, system information) because complexity of blind detection exceeds a maximum blind detection capability of the terminal device.

Optionally, the method 200 further includes the following step.

S240: Determine a first USS set.

S250: Monitoring a third PDCCH on a downlink control channel candidate resource of the first USS set.

A priority of the first USS set is lower than the priority of the second CSS set; or
a priority of the first USS set is higher than the priority of the second CSS set, and the priority of the first USS set is lower than the priority of the first CSS set.

A network device or a communication protocol may determine priorities of an NR USS set and a PS CSS set based on content carried in DCI corresponding to a power saving signal.

The third PDCCH and the first PDCCH have a same feature, and may be "PDCCHs of a non-power saving signal" or "R15 PDCCHs", or may be PDCCHs carrying the power saving signal.

The first USS set may be an existing USS set in the NR R15 standards, and a DCI format carried on the third PDCCH may be a DCI format carried on a control channel candidate resource in the existing USS set in the NR R15 standards, such as a DCI format 0_1 or 1_1.

If the content carried in the DCI corresponding to the power saving signal is relatively important, for example, the DCI includes power saving information shared by a group of UEs, for example, the group of UEs need to monitor a carrier group of a PDCCH, or the group of UEs are triggered to simultaneously "wake up" to enter a DRX active time, the network device or the communication protocol may set (for example, predefine or configure by using higher layer signaling) a priority sequence of the foregoing SS sets as: first CSS set>second CSS set>first USS set.

If the content carried in the DCI corresponding to the power saving signal is not so important, for example, the DCI includes different power saving information of each UE in a group of UEs, for example, the power saving information of some UEs is a BWP ID, and the power saving information of some UEs is CSI reporting, the network device or the communication protocol may set (for example, predefine or configure by using higher layer signaling) a priority sequence of the foregoing SS sets as: first CSS set>first USS set>second CSS set.

The UE may determine, based on the priority and the foregoing SS set priority method, whether to monitor the second CSS set and the first USS set.

Optionally, the method 200 further includes the following step.

S260: Determine the priorities of the second CSS set and the first USS set based on a value of an index number of the second CSS set and a value of an index number of the first USS set.

The network device or the communication protocol may configure the priorities of the two SS sets based on the index number of the second CSS set and the index number of the first USS set. For example, the network device or the communication protocol may configure a smaller index number for the second CSS set, and configure a larger index number for the first USS set, so that the priority of the second CSS set is higher than the priority of the first USS set. Alternatively, the network device or the communication protocol may configure a larger index number for the second CSS set, and configure a smaller index number for the first USS set, so that the priority of the second CSS set is lower than the priority of the first USS set.

When the UE determines an SS set that needs to be monitored, the first CSS set takes precedence over the first USS set and the second CSS set, that is, the UE preferentially determines the first CSS set as an SS set that needs to be monitored. In a configured first USS set (including a plurality of first USS sets) and second CSS set, a search space set with a smaller ID number (see Table 1) takes precedence over a search space set with a larger ID number. A remaining step is the same as that of the foregoing SS set priority method.

Optionally, the method 200 further includes the following steps.

S270: Determine a second USS set.

S280: Monitor a fourth PDCCH on a downlink control channel candidate resource of the second USS set, where the fourth PDCCH is used to carry a power saving signal, and the fourth PDCCH and the second PDCCH have a same feature.

The priority of the second USS set is lower than the priority of the first USS set.

The terminal device may further monitor, on a downlink control channel candidate resource of a USS set, a PDCCH carrying a power saving signal, that is, the fourth PDCCH. To avoid an increase in a latency of a data packet and a decrease in a throughput of a data packet because monitoring of the fourth PDCCH by the terminal device affects scheduling of data by the network device, the network device or the communication protocol may configure the priority of the second USS set to be lower than the priority of the first USS set. For example, a priority sequence of the first CSS set, the first USS set, and the second USS set may be: first CSS set>first USS set>second USS set. If the UE needs to monitor the second USS set and the second CSS set at the same time, a priority may be: first CSS set>second CSS set>first USS set>second USS set, or first CSS set>first USS set>second CSS set>second USS set.

Certainly, optionally, the priority of the second USS set may be higher than the priority of the first USS set.

The network device or the communication protocol may further configure an index number of the second USS set. For example, the index number of the second USS set is the larger one of the index number of the first USS set and the index number of the second USS set.

Optionally, the index number of the second USS set is the smaller one of the index number of the first USS set and the index number of the second USS set.

After determining the priority of the second CSS set, the terminal device may monitor a PDCCH on the downlink control channel candidate resources of the second CSS set and the second USS set in the DRX active time.

This application further provides an embodiment. For a power saving signal transmitted out of a DRX active time, in an existing communication protocol, the terminal device only needs to monitor, out of the DRX active time, DCI scrambled by using an SI-RNTI, a random access (random access, RA)-RNTI, a temporary cell (temporary cell, TC)-RNTI, and a P-RNTI, that is, the terminal device only needs to monitor control channel candidate resources of CSS sets (type 0/0A/1/2) corresponding to these RNTIs. Therefore, when the terminal device needs to additionally monitor a PS SS set, there is little chance of exceeding either of the two upper limits in Table 3. Therefore, when the terminal device needs to monitor the PS SS set out of the DRX active time, a standard may specify that when the network device needs to ensure that the terminal device monitors all SS sets in a slot out of the DRX active time, a quantity of monitored PDCCH candidates and a quantity of monitored non-overlapped CCEs do not exceed corresponding maximum quantities.

Therefore, out of the DRX active time, the terminal device does not need to monitor, in the slot based on a priority of the SS set, a PDCCH candidate that carries the power saving signal, but directly monitors all search space sets in the slot.

The foregoing mainly describes, from a perspective of the terminal device, the communication method provided in this application. There is a correspondence between a processing process of the network device and a processing process of the terminal device. For example, that the terminal device monitors a PDCCH means that the network device may send the PDCCH. Therefore, even if the processing process of the network device is not clearly described in some parts above, a person skilled in the art may clearly understand the processing process of the network device based on the processing process of the terminal device.

The foregoing describes in detail examples of the communication method provided in this application. It may be understood that, to implement the foregoing functions, a communications apparatus includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, the communications apparatus may be divided into functional units based on the foregoing method example. For example, each functional unit may be obtained through division based on a corresponding function, or two or more functions may be integrated into one processing unit. The integrated unit may be implemented in a form of hardware, or may be implemented in a form of a software functional unit. It should be noted that, division into the units in this application is an example, and is merely logical function division. During actual implementation, another division manner may be used.

Figure 14:
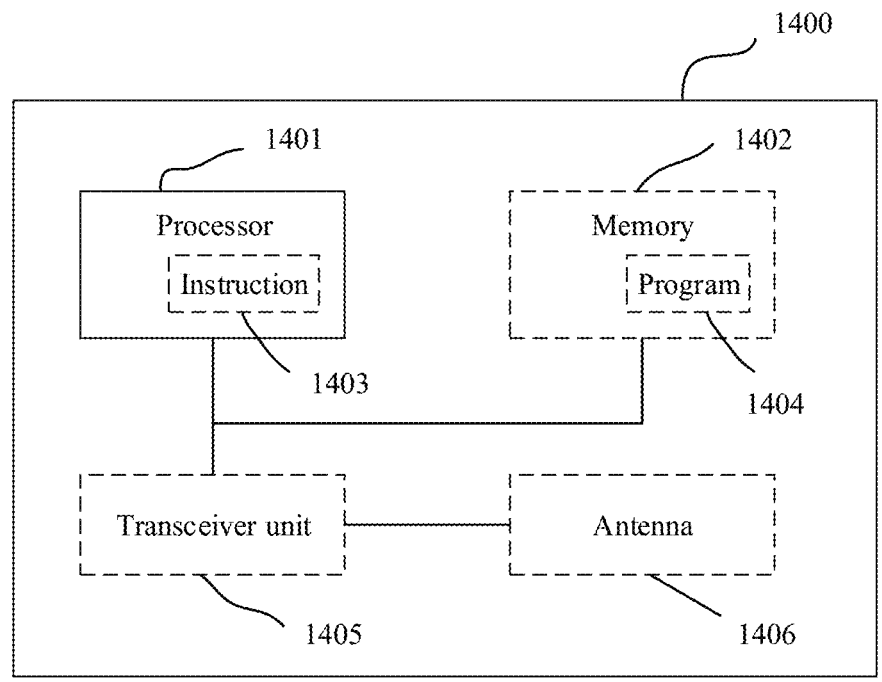
FIG. 14 is a schematic diagram of a communications apparatus according to this application.

FIG. 14 is a schematic diagram of a communications apparatus according to this application. A communications apparatus 1400 may be configured to implement the methods described in the foregoing method embodiments. The communications apparatus 1400 may be a chip, a network device, or a terminal device.

The communications apparatus 1400 includes one or more processors 1401. The one or more processors 1401 may support the communications apparatus 1400 in implementing the method in the method embodiment shown in FIG. 13 or FIG. 14. The processor 1401 may be a general-purpose processor or a dedicated processor. For example, the processor 1401 may be a central processing unit (central processing unit, CPU) or a baseband processor. The baseband processor may be configured to process communication data (for example, the foregoing power saving signal). The CPU may be configured to: control the communications apparatus (for example, a network device, a terminal device, or a chip), execute a software program, and process data of the software program. The communications apparatus 1400 may further include a transceiver unit 1405, configured to input (receive) and output (send) a signal.

For example, the communications apparatus 1400 may be a chip. The transceiver unit 1405 may be an input and/or output circuit of the chip, or the transceiver unit 1405 may be a communications interface of the chip. The chip may be used as a component of a terminal device, a network device, or another wireless communications device.

The communications apparatus 1400 may include one or more memories 1402. The memory 1402 stores a program 1404, and the program 1404 may be run by the processor 1401 to generate an instruction 1403, so that the processor 1401 performs, according to the instruction 1403, the methods described in the foregoing method embodiments. Optionally, the memory 1402 may further store data. Optionally, the processor 1401 may further read the data stored in the memory 1402. The data and the program 1404 may be stored at a same storage address, or the data and the program 1404 may be stored at different storage addresses.

The processor 1401 and the memory 1402 may be disposed separately, or may be integrated together, for example, integrated on a board or integrated into a system on chip (system on chip, SOC).

The communications apparatus 1400 may further include the transceiver unit 1405 and an antenna 1406. The transceiver unit 1405 may be referred to as a transceiver machine, a transceiver circuit, or a transceiver, and is configured to implement a transceiver function of the communications apparatus by using the antenna 1406.

In a possible design, the processor 1401 is configured to perform:
 determining a first CSS set;
 determining a second CSS set, where a priority of the first CSS set is higher than a priority of the second CSS set; and
 determining, based on the priority of the first CSS set and the priority of the second CSS set, whether to monitor a first physical downlink control channel PDCCH on a downlink control channel candidate resource of the first CSS set, and whether to monitor a second PDCCH on a downlink control channel candidate resource of the second CSS set, where the second PDCCH is used to carry a power saving signal.

Optionally, the processor 1401 is further configured to perform the following operation by using the transceiver unit 1405 and the antenna 1406:
 monitoring the first PDCCH on a downlink control channel candidate resource of a second SS set in a DRX active time.

In another possible design, the processor 1401 is configured to perform:
 determining a first CSS set;
 determining a second CSS set, where a priority of the first CSS set is higher than a priority of the second CSS set; and
 determining, based on the priority of the first CSS set and the priority of the second CSS set, whether to monitor a first PDCCH on a downlink control channel candidate resource of the first CSS set, and whether to monitor a second PDCCH on a downlink control channel candidate resource of the second CSS set, where the second PDCCH is used to carry a power saving signal.

Optionally, the processor 1401 is further configured to perform: determining a first USS set.

The processor 1401 is further configured to perform the following operation by using the transceiver unit 1405 and the antenna 1406: monitoring a third PDCCH on a downlink control channel candidate resource of the first USS set.

A priority of the first USS set is lower than the priority of the second CSS set; or
 a priority of the first USS set is higher than the priority of the second CSS set, and the priority of the first USS set is lower than the priority of the first CSS set.

Optionally, the processor 1401 is further configured to perform: determining the priorities of the second CSS set and the first USS set based on a value of an index number of the second CSS set and a value of an index number of the first USS set.

Optionally, the processor 1401 is further configured to perform: determining a second USS set.

The processor 1401 is further configured to perform the following operation by using the transceiver unit 1405 and the antenna 1406: monitoring a fourth PDCCH on a downlink control channel candidate resource of the second USS set, where the fourth PDCCH is used to carry a power saving signal.

A priority of the second USS set is lower than the priority of the first USS set.

Optionally, the processor 1401 is further configured to perform the following operation by using the transceiver unit 1405 and the antenna 1406: monitoring the second PDCCH and the fourth PDCCH on the downlink control channel candidate resources of the second CSS set and the second USS set in a DRX active time.

In another possible design, the processor 1401 is configured to perform:
 determining a first CSS set;
 determining a second CSS set, where a priority of the first CSS set is higher than a priority of the second CSS set; and
 determining, based on the priority of the first CSS set and the priority of the second CSS set, whether to send a first physical downlink control channel PDCCH on a downlink control channel candidate resource of the first CSS set, and whether to send a second PDCCH on a downlink control channel candidate resource of the second CSS set, where the second PDCCH is used to carry a power saving signal.

Optionally, the processor 1401 is further configured to perform the following operation by using the transceiver unit 1405 and the antenna 1406:
 sending the first PDCCH on a downlink control channel candidate resource of a second SS set in a DRX active time.

In another possible design, the processor 1401 is configured to perform:
 determining a first CSS set;
 determining a second CSS set, where a priority of the first CSS set is higher than a priority of the second CSS set; and
 determining, based on the priority of the first CSS set and the priority of the second CSS set, whether to send a first PDCCH on a downlink control channel candidate resource of the first CSS set, and whether to send a second PDCCH on a downlink control channel candidate resource of the second CSS set, where the second PDCCH is used to carry a power saving signal.

Optionally, the processor 1401 is further configured to perform: determining a first USS set.

The processor 1401 is further configured to perform the following operation by using the transceiver unit 1405 and the antenna 1406: sending a third PDCCH on a downlink control channel candidate resource of the first USS set.

A priority of the first USS set is lower than the priority of the second CSS set; or
 a priority of the first USS set is higher than the priority of the second CSS set, and the priority of the first USS set is lower than the priority of the first CSS set.

Optionally, the processor 1401 is further configured to perform: determining the priorities of the second CSS set and the first USS set based on a value of an index number of the second CSS set and a value of an index number of the first USS set.

Optionally, the processor 1401 is further configured to perform: determining a second USS set.

The processor 1401 is further configured to perform the following operation by using the transceiver unit 1405 and the antenna 1406: sending a fourth PDCCH on a downlink control channel candidate resource of the second USS set, where the fourth PDCCH is used to carry a power saving signal.

A priority of the second USS set is lower than the priority of the first USS set.

Optionally, the processor 1401 is further configured to perform the following operation by using the transceiver unit 1405 and the antenna 1406: sending the second PDCCH and the fourth PDCCH on the downlink control channel candidate resources of the second CSS set and the second USS set in a DRX active time.

For a specific manner of monitoring or sending the power saving signal in each search space, refer to related descriptions in the foregoing method embodiments.

It should be understood that steps in the foregoing method embodiments may be implemented by using a logic circuit in a form of hardware or an instruction in a form of software in the processor 1401. The processor 1401 may be a CPU, a digital signal processor (digital signal processor, DSP), an application-specific integrated circuit (application-specific integrated circuit, ASIC), a field programmable gate array (field programmable gate array, FPGA), or another programmable logic device, for example, a discrete gate, a transistor logic device, or a discrete hardware component.

This application further provides a computer program product. When the computer program product is executed by the processor 1401, the communication method according to any one of the method embodiments of this application is implemented.

The computer program product may be stored in the memory 1402. For example, the computer program product is the program 1404. After processing processes such as preprocessing, compilation, assembly, and linking, the program 1404 is finally converted into an executable target file that can be executed by the processor 1401.

This application further provides a computer-readable storage medium. The computer-readable storage medium stores a computer program. When the computer program is executed by a computer, the communication method according to any one of the method embodiments of this application is implemented. The computer program may be a high-level language program, or may be an executable target program.

The computer-readable storage medium is, for example, the memory 1402. The memory 1402 may be a volatile memory or a nonvolatile memory, or the memory 1402 may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

Figure 15:
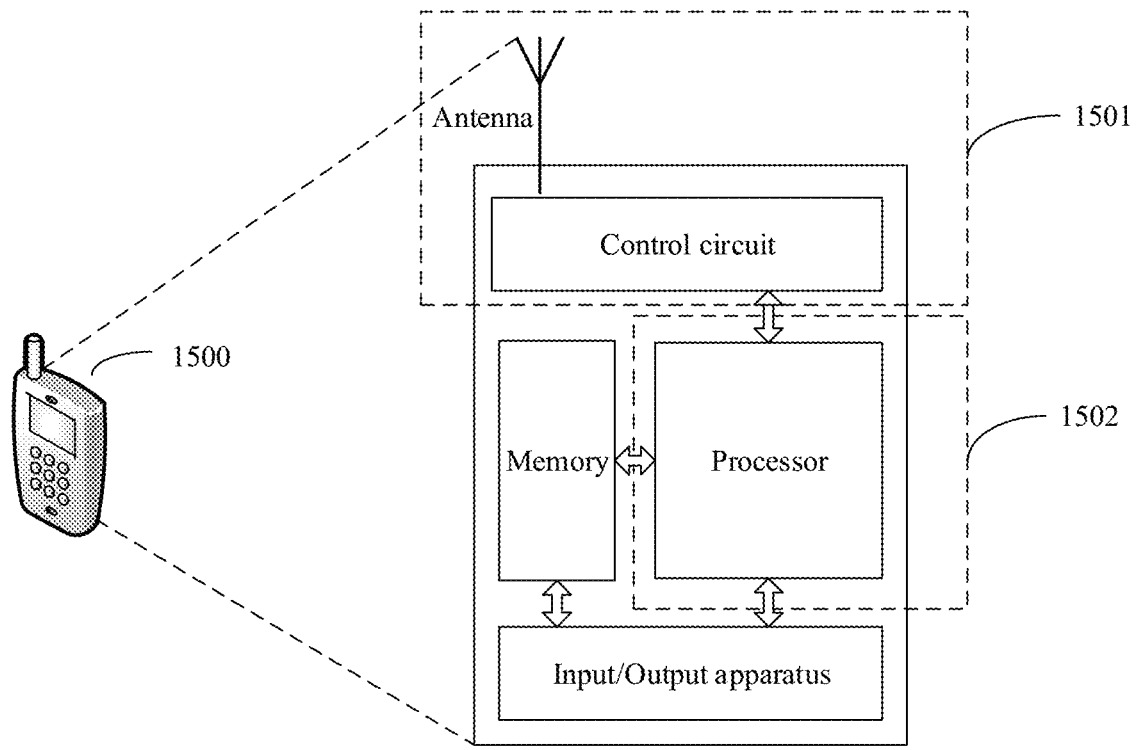
FIG. 15 is a schematic diagram of a terminal device according to this application.

When the communications apparatus 1400 is a terminal device, FIG. 15 is a schematic diagram of a terminal device according to this application. A terminal device 1500 may be applicable to the system shown in FIG. 1, to implement a function of the terminal device in the foregoing method embodiments. For ease of description, FIG. 15 shows only main components of the terminal device.

As shown in FIG. 15, the terminal device 1500 includes a processor, a memory, a control circuit, an antenna, and an input/output apparatus. The processor is mainly configured to: process a communication protocol and communications data, and control the entire terminal device. For example, the processor receives a power saving signal by using the antenna and the control circuit. The memory is mainly configured to store a program and data, for example, store a communication protocol and to-be-sent data. The control circuit is mainly configured to: perform conversion between a baseband signal and a radio frequency signal, and process the radio frequency signal. A combination of the control circuit and the antenna may also be referred to as a transceiver that is mainly configured to send and receive a radio frequency signal in an electromagnetic wave form. The input/output apparatus, such as a touchscreen or a keyboard, is mainly configured to: receive data entered by a user, and output data to the user.

After the terminal device is powered on, the processor may read the program in the memory, interpret and execute instructions included in the program, and process data in the program. When information needs to be sent by using the antenna, the processor performs baseband processing on the to-be-sent information, and outputs a baseband signal to a radio frequency circuit. The radio frequency circuit performs radio frequency processing on the baseband signal to obtain a radio frequency signal, and sends, by using the antenna, the radio frequency signal in an electromagnetic wave form. When an electromagnetic wave (namely, the radio frequency signal) carrying information arrives at the terminal device, the radio frequency circuit receives the radio frequency signal by using the antenna, converts the radio frequency signal into the baseband signal, and outputs the baseband signal to the processor. The processor converts the baseband signal into the information and processes the information.

A person skilled in the art may understand that, for ease of description, FIG. 15 shows only one memory and only one processor. In an actual terminal device, there may be a plurality of processors and a plurality of memories. The memory may also be referred to as a storage medium, a storage device, or the like. This is not limited in this application.

In an optional implementation, the processor in FIG. 15 may integrate functions of a baseband processor and a CPU. A person skilled in the art may understand that the baseband processor and the CPU may alternatively be independent processors, and are interconnected by using a technology such as a bus. A person skilled in the art may understand that the terminal device may include a plurality of baseband processors to adapt to different network standards, the terminal device may include a plurality of CPUs to improve a processing capability of the terminal device, and the components of the terminal device may be connected by using various buses. The baseband processor may also be referred to as a baseband processing circuit or a baseband processing chip. The CPU may also be referred to as a central processing circuit or a central processing chip. A function of processing the communication protocol and the communications data may be embedded into the processor, or may be stored in the memory in a form of a program, so that the processor executes the program in the memory to implement a baseband processing function.

In this application, the antenna and the control circuit that have sending and receiving functions may be considered as a transceiver unit 1501 of the terminal device 1500. The transceiver unit 1501 is configured to support the terminal device in implementing the receiving function in the method embodiments, or is configured to support the terminal device in implementing the sending function in the method embodiments. The processor having a processing function is considered as a processing unit 1502 of the terminal device 1500. As shown in FIG. 15, the terminal device 1500 includes the transceiver unit 1501 and the processing unit 1502. The transceiver unit may also be referred to as a transceiver, a transceiver machine, a transceiver apparatus, or the like. Optionally, a device that is configured to implement the receiving function and that is in the transceiver unit 1501 may be considered as a receiving unit, and a device that is configured to implement the sending function and that is in the transceiver unit 1501 may be considered as a sending unit. In other words, the transceiver unit 1501 includes the receiving unit and the sending unit. The receiving unit may also be referred to as a receiver, an input port, a receiving circuit, or the like. The sending unit may be referred to as a transmitter machine, a transmitter, a transmitting circuit, or the like.

The processor 1502 may be configured to execute the program stored in the memory, to control the transceiver unit 1501 to receive a signal and/or send a signal, to complete a function of the terminal device in the foregoing method embodiments. In an implementation, a function of the transceiver unit 1501 may be considered to be implemented by using a transceiver circuit or a transceiver-dedicated chip.

Figure 16:
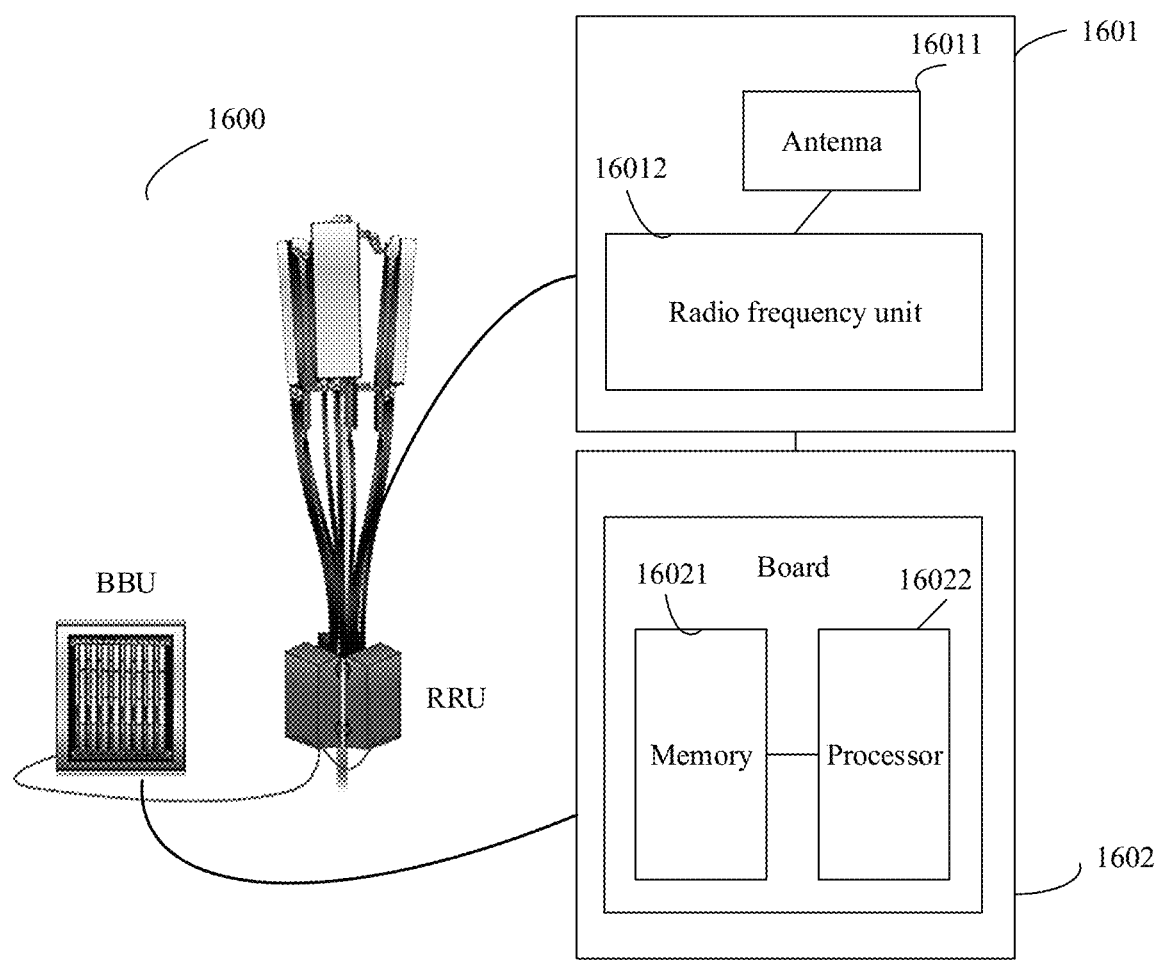
FIG. 16 is a schematic diagram of a network device according to this application.

When the communications apparatus 1400 is a network device, FIG. 16 is a schematic diagram of a network device according to this application. The network device may be, for example, a base station. As shown in FIG. 16, the base station may be applied to the system shown in FIG. 1, to implement a function of the network device in the foregoing method embodiments. A base station 1600 may include one or more radio frequency units, for example, a remote radio unit (remote radio unit, RRU) 1601 and at least one baseband unit (baseband unit, BBU) 1602. The BBU 1602 may include a distributed unit (distributed unit, DU), or may include a DU and a central unit (central unit, CU).

The RRU 1601 may be referred to as a transceiver unit, a transceiver machine, a transceiver circuit, or a transceiver, and may include at least one antenna 16011 and a radio frequency unit 16012. The RRU 1601 is mainly configured to perform receiving and sending of a radio frequency signal and conversion between a radio frequency signal and a baseband signal, for example, configured to support the base station in implementing a sending function and a receiving function in the method embodiments. The BBU 1602 is mainly configured to: perform baseband processing, control the base station, and the like. The RRU 1601 and the BBU 1602 may be physically disposed together, or may be physically separately disposed, that is, in a distributed base station.

The BBU 1602 may also be referred to as a processing unit, and is mainly configured to complete a baseband processing function such as channel coding, multiplexing, modulation, or spreading. For example, the BBU 1602 may be configured to control the base station to perform an operation procedure related to the network device in the foregoing method embodiments.

The BBU 1602 may include one or more boards. A plurality of boards may jointly support a radio access network (for example, a long term evolution (long term evolution, LTE) network) of a single access standard, or may separately support radio access networks (for example, an LTE network and an NR network) of different access standards. The BBU 1602 further includes a memory 16021 and a processor 16022. The memory 16021 is configured to store necessary instructions and necessary data. For example, the memory 16021 stores the power saving signal in the foregoing method embodiments. The processor 16022 is configured to control the base station to perform a necessary action, for example, is configured to control the base station to perform the operation procedure in the foregoing method embodiments. The memory 16021 and the processor 16022 may serve one or more boards. In other words, a memory and a processor may be independently disposed on each board. Alternatively, a plurality of boards may share a same memory and a same processor. In addition, each board may be further provided with a necessary circuit.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, the disclosed system, apparatus, and method may be implemented in other manners. For example, some features of the method embodiments described above may be ignored or not performed. The described apparatus embodiments are merely examples. Division into the units is merely logical function division and may be other division during actual implementation. A plurality of units or components may be combined or integrated into another system. In addition, a coupling between the units or a coupling between the components may be a direct coupling, or may be an indirect coupling. The foregoing coupling includes an electrical connection, a mechanical connection, or a connection in another form.

It should be understood that values of sequence numbers of the foregoing processes do not mean execution sequences in the various embodiments of this application. The execution sequences of the processes should be determined based on functions and internal logic of the processes, and should not be construed as any limitation on the implementation processes of the embodiments of this application.

In addition, the terms "system" and "network" in this specification may be often used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In addition, the description "at least one of . . . " indicates one of listed items or any combination thereof. For example, "at least one of A, B, and C" may indicate the following six cases: Only A exists, only B exists, only C exists, both A and B exist, both B and C exist, both A and C exist, and A, B, and C all exist.

In conclusion, the foregoing descriptions are merely example embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A downlink control channel monitoring method, comprising:
   determining a first search space (SS) set and a second SS set; and
   determining, based on a first priority of the first SS set and a second priority of the second SS set, whether to monitor a first physical downlink control channel (PDCCH) on a first downlink control channel candidate resource of the first SS set, and whether to monitor a second PDCCH on a second downlink control channel candidate resource of the second SS set, wherein:
   the first priority of the first SS set is equal to the second priority of the second SS set;
   the second PDCCH carries a power saving signal; and
   the first SS set comprises M first downlink control channel candidates at an aggregation level L, the second SS set comprises m second downlink control channel candidates at the aggregation level L, m and M are positive integers, m≤M, and the m second downlink control channel candidates are m downlink control channel candidates of the M first downlink control channel candidates.

2. The method according to claim 1, wherein the first PDCCH carries first downlink control information (DCI), the second PDCCH carries second DCI, and a size of the first DCI is equal to a size of the second DCI.

3. The method according to claim 2, wherein:
   when the second SS set is a UE-specific search space (USS) set, the first SS set is a USS set, a format of the first DCI is a format 1_0 or a format 0_0, and a cyclic redundancy check of the second DCI is scrambled by using a cell radio network temporary identifier.

4. The method according to claim 1, wherein the first downlink control channel candidate resource of the first SS set comprises the second downlink control channel candidate resource of the second SS set, and the first SS set and the second SS set are associated with a same control resource set.

5. The method according to claim 1, wherein a first start symbol of the first downlink control channel candidate resource of the first SS set and a second start symbol of the second downlink control channel candidate resource of the second SS set in a slot are identical.

6. The method according to claim 1, further comprising:
   monitoring the second PDCCH on the second downlink control channel candidate resource of the second SS set in a discontinuous reception active time.

7. A downlink control channel sending method, comprising:
   determining a first search space (SS) set and a second SS set; and
   determining, based on a first priority of the first SS set and a second priority of the second SS set, whether to send a first physical downlink control channel (PDCCH) on a first downlink control channel candidate resource of the first SS set, and whether to send a second PDCCH on a second downlink control channel candidate resource of the second SS set, wherein:
   the first priority of the first SS set is equal to the second priority of the second SS set;
   the second PDCCH carries a power saving signal; and
   the first SS set comprises M first downlink control channel candidates at an aggregation level L, the second SS set comprises m second downlink control channel candidates at the aggregation level L, m and M are positive integers, m≤M, and the m second downlink control channel candidates are m downlink control channel candidates of the M first downlink control channel candidates.

8. The method according to claim 7, wherein the first PDCCH carries first downlink control information (DCI), the second PDCCH carries second DCI, and a size of the first DCI is equal to a size of the second DCI.

9. The method according to claim 8, wherein:
   when the second SS set is a UE-specific search space (USS) set, the first SS set is a USS set, a format of the first DCI is a format 1_0 or a format 0_0, and a cyclic redundancy check of the second DCI is scrambled by using a cell radio network temporary identifier.

10. The method according to claim 7, wherein a first start symbol of the first downlink control channel candidate resource of the first SS set and a second start symbol of the second downlink control channel candidate resource of the second SS set in a slot are identical.

11. The method according to claim 7, further comprising:
    sending the second PDCCH on the second downlink control channel candidate resource of the second SS set in a discontinuous reception active time.

12. An apparatus, comprising:
    one or more processors; and
    one or more memories coupled to the one or more processors, the one or more memories storing programming instructions that, when executed by the one or more processors, cause the apparatus to:
    determine a first search space (SS) set and a second SS set; and
    determine, based on a first priority of the first SS set and a second priority of the second SS set, whether to monitor a first physical downlink control channel (PDCCH) on a first downlink control channel candidate resource of the first SS set, and whether to monitor a second PDCCH on a second downlink control channel candidate resource of the second SS set, wherein:
    the first priority of the first SS set is equal to the second priority of the second SS set; and
    the second PDCCH carries a power saving signal; and
    the first SS set comprises M first downlink control channel candidates at an aggregation level L, the second SS set comprises m second downlink control channel candidates at the aggregation level L, m and M are positive integers, m≤M, and the m second downlink control channel candidates are m downlink control channel candidates of the M first downlink control channel candidates.

13. The apparatus according to claim 12, wherein the first PDCCH carries first downlink control information (DCI), the second PDCCH carries second DCI, and a size of the first DCI is equal to a size of the second DCI.

14. The apparatus according to claim 13, wherein:
    when the second SS set is a UE-specific search space (USS) set, the first SS set is a USS set, a format of the first DCI is a format 1_0 or a format 0_0, and a cyclic redundancy check of the second DCI is scrambled by using a cell radio network temporary identifier.

15. The apparatus according to claim 12, wherein the first downlink control channel candidate resource of the first SS set comprises the second downlink control channel candidate resource of the second SS set, and the first SS set and the second SS set are associated with a same control resource set.

16. The apparatus according to claim 12, wherein a first start symbol of the first downlink control channel candidate resource of the first SS set and a second start symbol of the second downlink control channel candidate resource of the second SS set in a slot are identical.

17. The apparatus according to claim 12, wherein the programming instructions, when executed by the one or more processors, further cause the apparatus to:
  monitor the second PDCCH on the second downlink control channel candidate resource of the second SS set in a discontinuous reception active time.

* * * * *